(12) United States Patent
Tipton et al.

(10) Patent No.: US 11,212,320 B2
(45) Date of Patent: Dec. 28, 2021

(54) LOCATION BASED SHARING OF A NETWORK ACCESS CREDENTIAL

(71) Applicants: AT&T Mobility II LLC, Atlanta, GA (US); AT&T INTELLECTUAL PROPERTY I, L.P., Atlanta, GA (US)

(72) Inventors: Rick Tipton, Corryton, TN (US); Mark Austin, Roswell, GA (US); Mario Kosseifi, Roswell, GA (US); Mostafa Tofighbakhsh, Cupertino, CA (US)

(73) Assignees: AT&T Mobility II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 15 days.

(21) Appl. No.: 16/803,344

(22) Filed: Feb. 27, 2020

(65) Prior Publication Data
US 2020/0195692 A1    Jun. 18, 2020

Related U.S. Application Data

(63) Continuation of application No. 16/434,164, filed on Jun. 6, 2019, now Pat. No. 10,594,739, which is a
(Continued)

(51) Int. Cl.
*H04L 29/06* (2006.01)
*H04W 24/00* (2009.01)
(Continued)

(52) U.S. Cl.
CPC ............. *H04L 63/20* (2013.01); *H04L 63/08* (2013.01); *H04L 67/18* (2013.01); *H04L 67/306* (2013.01);
(Continued)

(58) Field of Classification Search
CPC ..... H04W 12/06; H04W 12/04; H04W 24/00; H04W 12/08; H04W 12/43; H04W 12/61;
(Continued)

(56) References Cited

U.S. PATENT DOCUMENTS 4,718,081 A    1/1988   Brenig
5,515,062 A    5/1996   Maine et al.
(Continued)

FOREIGN PATENT DOCUMENTS

EP    0 856 746 A2    8/1998
EP    1 145 526 A2    10/2001
(Continued)

OTHER PUBLICATIONS

Notice of Allowance dated Aug. 12, 2013 for U.S. Appl. No. 13/174,541, 40 pages.
(Continued)

*Primary Examiner* — Brandon J Miller
(74) *Attorney, Agent, or Firm* — Amin, Turocy & Watson, LLP

(57) ABSTRACT

A network access credential can be shared among devices based on location information for a device. Location information can include timed fingerprint location information. In an aspect, location information can be associated with a location of user equipment. This location information can be correlated with network access credentials. Location information can be used to access a relevant network access credential. The relevant network access credential can be shared with other devices. In an embodiment, sharing a network access credential can be between mobile devices. In another embodiment, sharing a network access credential can be between a remote computing device and a mobile device. Sharing a credential can allow for access to a network without having to generate or input new credentials.

20 Claims, 10 Drawing Sheets

Related U.S. Application Data continuation of application No. 16/108,060, filed on Aug. 21, 2018, now Pat. No. 10,362,066, which is a continuation of application No. 15/603,416, filed on May 23, 2017, now Pat. No. 10,084,824, which is a continuation of application No. 14/957,525, filed on Dec. 2, 2015, now Pat. No. 9,667,660, which is a continuation of application No. 14/530,605, filed on Oct. 31, 2014, now Pat. No. 9,232,399, which is a continuation of application No. 13/291,917, filed on Nov. 8, 2011, now Pat. No. 8,909,247.

(51) Int. Cl.
| | | |
|---|---|---|
| H04W 12/04 | (2021.01) | |
| H04W 12/08 | (2021.01) | |
| H04L 29/08 | (2006.01) | |
| H04W 12/06 | (2021.01) | |
| H04W 12/43 | (2021.01) | |
| H04W 12/61 | (2021.01) | |
| H04W 12/63 | (2021.01) | |

(52) U.S. Cl.
CPC ............ *H04W 12/04* (2013.01); *H04W 12/06* (2013.01); *H04W 12/08* (2013.01); *H04W 24/00* (2013.01); *H04W 12/43* (2021.01); *H04W 12/61* (2021.01); *H04W 12/63* (2021.01)

(58) Field of Classification Search
CPC ........ H04W 12/63; H04L 63/20; H04L 63/08; H04L 67/306; H04L 67/18
See application file for complete search history.

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu |
| 6,311,078 B1 | 10/2001 | Hardouin |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri |
| 6,594,576 B2 | 7/2003 | Fan et al. |
| 6,604,083 B1 | 8/2003 | Bailey |
| 6,668,226 B2 | 12/2003 | Sutanto |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,274,925 B2 * | 9/2007 | Chaar .................. H04M 15/12 379/111 |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec et al. |
| 7,664,492 B1 | 2/2010 | Lee et al. |
| 7,696,922 B2 | 4/2010 | Nicholson et al. |
| 7,697,917 B2 | 4/2010 | Camp, Jr. et al. |
| 7,706,964 B2 | 4/2010 | Horvitz et al. |
| 7,744,740 B2 | 6/2010 | Diehl |
| 7,747,258 B2 | 6/2010 | Farmer |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera |
| 8,295,854 B2 | 10/2012 | Osann, Jr. |
| 8,300,663 B2 | 10/2012 | Chion et al. |
| 8,307,030 B1 | 11/2012 | Hu |
| 8,326,682 B2 | 12/2012 | Redford et al. |

(56) References Cited

U.S. PATENT DOCUMENTS

| | | |
|---|---|---|
| 8,355,364 B1 | 1/2013 | Vargantwar et al. |
| 8,355,865 B2 | 1/2013 | Wagner et al. |
| 8,402,356 B2 | 3/2013 | Martinez et al. |
| 8,417,264 B1 | 4/2013 | Whitney et al. |
| 8,437,790 B1 | 5/2013 | Hassan et al. |
| 8,464,164 B2 | 6/2013 | Hon et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes, Jr. |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,768,348 B2 | 7/2014 | Stuempert et al. |
| 8,849,254 B2 | 9/2014 | Bolon et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,929,827 B2 | 1/2015 | Fix et al. |
| 9,002,373 B2 | 4/2015 | Marti et al. |
| 9,008,684 B2 | 4/2015 | Tipton et al. |
| 9,008,698 B2 | 4/2015 | Meredith et al. |
| 9,053,513 B2 | 6/2015 | Meredith et al. |
| 9,066,227 B2 | 6/2015 | Spencer et al. |
| 9,100,891 B2 | 8/2015 | Zheng et al. |
| 9,137,772 B2 | 9/2015 | Hazzani et al. |
| 9,196,157 B2 | 11/2015 | Hardin et al. |
| 9,232,399 B2 | 1/2016 | Tipton et al. |
| 9,351,111 B1 | 5/2016 | Kaufman et al. |
| 9,473,904 B2 | 10/2016 | Bennett |
| 9,510,355 B2 | 11/2016 | Meredith et al. |
| 9,519,043 B2 | 12/2016 | Fix et al. |
| 9,537,950 B2 | 1/2017 | Ibasco et al. |
| 9,564,962 B2 | 2/2017 | Yarnold et al. |
| 9,596,671 B2 | 3/2017 | Fix et al. |
| 9,667,660 B2 | 5/2017 | Tipton et al. |
| 9,723,446 B2 | 8/2017 | Fix et al. |
| 9,769,615 B2 | 9/2017 | Fix et al. |
| 9,769,623 B2 | 9/2017 | Fix et al. |
| 9,807,250 B2 | 10/2017 | Austin et al. |
| 9,810,765 B2 | 11/2017 | Fix et al. |
| 9,813,900 B2 | 11/2017 | Meredith et al. |
| 9,858,575 B2 | 1/2018 | Meredith et al. |
| 10,084,824 B2 | 9/2018 | Tipton et al. |
| 10,206,056 B2 | 2/2019 | Kaufman et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0069024 A1 | 4/2003 | Kennedy, Jr. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0043037 A1 | 2/2005 | Ioppe et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0143292 A1 | 6/2006 | Taubenheim et al. |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0276168 A1 | 12/2006 | Fuller, Jr. et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0077532 A1* | 3/2008 | Von Heesen ......... G06Q 20/023 705/67 |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0261611 A1 | 10/2008 | Mia et al. |
| 2008/0274750 A1 | 11/2008 | Carlson et al. |
| 2008/0293436 A1 | 11/2008 | Fok et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1 | 3/2009 | Howarter et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren |
| 2009/0125380 A1 | 5/2009 | Otto et al. |
| 2009/0131073 A1 | 5/2009 | Carlson et al. |
| 2009/0161599 A1 | 6/2009 | Haartsen et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0288145 A1* | 11/2009 | Huber .................. H04L 63/101 726/3 |
| 2009/0299788 A1 | 12/2009 | Huber et al. |
| 2009/0310501 A1 | 12/2009 | Catovic et al. |

(56) References Cited

U.S. PATENT DOCUMENTS

| | | |
|---|---|---|
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0009696 A1 | 1/2010 | Fok et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi |
| 2010/0161965 A1* | 6/2010 | Solin .................. H04L 9/3268 713/155 |
| 2010/0163632 A1 | 7/2010 | Tseng et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0313157 A1 | 10/2010 | Carlsson et al. |
| 2010/0279708 A1 | 11/2010 | Lidsrom et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0028129 A1 | 2/2011 | Hutchison et al. |
| 2011/0039593 A1 | 2/2011 | Lee et al. |
| 2011/0047603 A1* | 2/2011 | Gordon .................. H04L 63/06 726/5 |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly et al. |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0175724 A1 | 7/2011 | Kent |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0069386 A1 | 3/2012 | St. Laurent et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0143758 A1 | 6/2012 | Anantha et al. |
| 2012/0144452 A1 | 6/2012 | Dyor et al. |
| 2012/0144457 A1 | 6/2012 | Counterman |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0192258 A1 | 7/2012 | Spencer et al. |
| 2012/0214509 A1 | 8/2012 | Levin et al. |
| 2012/0221232 A1 | 8/2012 | Shang et al. |
| 2012/0253656 A1 | 10/2012 | Brandt |
| 2012/0266217 A1* | 10/2012 | Kaal .................. G06F 21/6245 726/4 |
| 2012/0276900 A1 | 11/2012 | Stephens et al. |
| 2012/0282924 A1 | 11/2012 | Tagg et al. |
| 2012/0286997 A1 | 11/2012 | Lin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1* | 12/2012 | Hillier .................. H04W 4/02 705/14.73 |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0078994 A1 | 3/2013 | Jouin |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0150053 A1 | 6/2013 | Hwang et al. |
| 2013/0226451 A1 | 8/2013 | O'Neill et al. |
| 2013/0267242 A1 | 10/2013 | Curticapean et al. |
| 2013/0267249 A1 | 10/2013 | Rosenberg |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0137197 A1* | 5/2014 | Lazaridis .............. H04W 12/50 726/3 |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2014/0365488 A1 | 12/2014 | Arslan et al. |
| 2015/0011249 A1 | 1/2015 | Siliski et al. |
| 2015/0098712 A1 | 4/2015 | Li et al. |
| 2015/0147997 A1 | 5/2015 | Shaw et al. |
| 2015/0324718 A1 | 11/2015 | Lord et al. |
| 2016/0321642 A1 | 11/2016 | Kaufman et al. |

(56) References Cited

U.S. PATENT DOCUMENTS

| | | |
|---|---|---|
| 2017/0280317 A1 | 9/2017 | Tagg et al. |
| 2017/0318428 A1 | 11/2017 | Wang et al. |
| 2019/0166574 A1 | 5/2019 | Abou-Rizk et al. |

FOREIGN PATENT DOCUMENTS

| | | |
|---|---|---|
| EP | 2 999 241 A1 | 3/2016 |
| JP | 2004-069609 A | 3/2004 |
| JP | 2005-091303 A | 4/2005 |
| JP | 2007-328050 A | 12/2007 |
| WO | 2006/031035 A1 | 3/2006 |

OTHER PUBLICATIONS

Final Office Action dated Aug. 2, 2013 for U.S. Appl. No. 13/188,295, 26 pages.
Final Office Action dated Aug. 2, 2013 for U.S. Appl. No. 13/188,300, 38 pages.
Non-Final Office Action dated Jun. 20, 2013 for U.S. Appl. No. 13/219,911, 61 pages.
Non-Final Office Action dated Jul. 17, 2013 for U.S. Appl. No. 13/188,345, 27 pages.
Non-Final Office Action dated Jun. 20, 2013 for U.S. Appl. No. 13/291,917, 52 pages.
Non-Final Office Action dated May 31, 2013 for U.S. Appl. No. 13/523,770, 40 pages.
Non-Final Office Action dated Sep. 19, 2013 for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 85 pages.
RouteFinder 3.00 for ArGIS Documentation, © 2007 Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013 for U.S. Appl. No. 13/284,497, 30 pages.
Final Office Action dated Aug. 22, 2013 for U.S. Appl. No. 13/277,595, 36 pages.
Final Office Action dated Oct. 21, 2013 for U.S. Appl. No. 13/523,770, 24 pages.
Final Office Action dated Nov. 5, 2013 for U.S. Appl. No. 13/188,345, 30 pages.
Non-Final Office Action dated Dec. 11, 2013 for U.S. Appl. No. 13/188,295, 52 pages.
Non-Final Office Action dated Dec. 24, 2013 for U.S. Appl. No. 13/188,300, 44 pages.
Final Office Action dated Dec. 11, 2013 for U.S. Appl. No. 13/291,917, 48 pages.
Final Office Action dated Jan. 15, 2014 for U.S. Appl. No. 13/219,911, 38 pages.
Final Office Action dated Jan. 28, 2014 for U.S. Appl. No. 12/958,146, 24 pages.
Notice of Allowance dated Feb. 14, 2014 for U.S. Appl. No. 13/284,456, 47 pages.
Final Office Action dated Feb. 24, 2014 for U.S. Appl. No. 13/927,020, 18 pages.
Marko Silventoinen, Timo Rantalainen, "Mobile Station Locating in GSM" Helsinki, Finland, Last accessed on Nov. 15, 2011, 7 pages.
Non-Final Office Action dated Dec. 30, 2013 for U.S. Appl. No. 13/305,267, 10 pages.
Final Office Action dated May 21, 2013 for U.S. Appl. No. 13/305,276, 28 pages.
Non-Final Office Action dated Oct. 24, 2012 for U.S. Appl. No. 13/305,276, 37 pages.
Locate your friends in real time with Google Latitude. http://googlemobile.blogspot.com/2009/02/locate-your-friends-in-real-time-with.html. Last accessed Mar. 8, 2012, 23 pages.
Location sharing and updating. http://support.google.com/mobile/bin/answer.py?hl=en&answer=136647. Last accessed Mar. 8, 2012, 3 pages.
Privacy Settings. http://support.google.com/mobile/bin/answer.py?hl=en&answer=136650, Last accessed Mar. 8, 2012, 1 page.
Final Office Action dated Nov. 25, 2013 for U.S. Appl. No. 13/447,069, 40 pages.
Non-Final Office Action dated May 9, 2013 for U.S. Appl. No. 13/447,069, 33 pages.
Janice Y. Tsai et al., Location-Sharing Technologies: Privacy Risks and Controls, pp. 1-26, Feb. 2010.
Nan Li et al., Sharing Location in Online Social Networks, pp. 20-25, IEEE Network, Oct. 2010.
Janice Y. Tsai et al., Who's Viewed You? The Impact of Feedback in a Mobile Location-Sharing Application, pp. 2003-2012, CHI.
Pettersen, et al., "Automatic antenna tilt control for capacity enhancement in UMTS FDD." Last accessed Mar. 25, 2012, 5 pages.
Islam, et al., "Self-Optimization of Antenna Tilt and Pilot Power for Dedicated Channels." Last accessed Mar. 25, 2012, 3 pages.
Bigham, et al., "Tilting and Beam-shaping for Traffic Load Balancing in WCDMA Network." Last accessed Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN lu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. http://senseable.mit.edu/papers/pdf/2010_Calabrese_et_al_Rome_TITS.pdf).
Smith, et al., "Airsage Overview", Dec. 2011, 39 pages. http://mikeontraffic.typepad.com/files/raleigh-winter-2011-presentation-v11-final.pdf.
Non-Final Office Action dated Feb. 5, 2014 for U.S. Appl. No. 13/526,988, 56 pages.
Non-Final Office Action dated Mar. 25, 2014 for U.S. Appl. No. 13/488,144, 60 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Final Office Action dated Jul. 5, 2017 for U.S. Appl. No. 15/191,877, 32 pages.
Non-Final Office Action dated Jul. 25, 2017 for U.S. Appl. No. 15/422,147, 86 pages.
Non-Final Office Action dated Aug. 24, 2017 for U.S. Appl. No. 14/881,335, 125 pages.
Notice of Allowance dated Aug. 16, 2017 for U.S. Appl. No. 14/877,915, 63 pages.
Non-Final Office Action dated Oct. 4, 2017 for U.S. Appl. No. 15/235,502, 80 pages.
Non-Final Office Action dated Sep. 28, 2017 for U.S. Appl. No. 15/344,468, 107 pages.
Non-Final Office Action dated Sep. 28, 2017 for U.S. Appl. No. 15/132,220, 29 pages.

(56) References Cited

OTHER PUBLICATIONS

Non-Final Office Action dated Oct. 18, 2017 for U.S. Appl. No. 15/629,366, 131 pages.
Non-Final Office Action dated Oct. 16, 2017 for U.S. Appl. No. 15/131,793, 84 pages.
Non-Final Office Action dated Nov. 15, 2017 for U.S. Appl. No. 15/191,877, 30 pages.
Final Office Action dated Jan. 8, 2018 for U.S. Appl. No. 15/132,220, 30 pages.
Non-Final Office Action dated Jan. 24, 2018 for U.S. Appl. No. 15/603,416, 99 pages.
Final Office Action dated Feb. 13, 2018 for U.S. Appl. No. 14/881,335, 54 pages.
Final Office Action dated Mar. 30, 2018 for U.S. Appl. No. 15/235,502, 14 pages.
Final Office Action dated Mar. 27, 2018 for U.S. Appl. No. 15/629,366, 23 pages.
Non-Final Office Action dated May 2, 2018 for U.S. Appl. No. 14/704,949, 95 pages.
Non-Final Office Action dated May 11, 2018 for U.S. Appl. No. 15/132,220, 29 pages.
Non-Final Office Action dated May 30, 2018 for U.S. Appl. No. 15/629,366, 30 pages.
Non-Final Office Action dated May 31, 2018 for U.S. Appl. No. 15/603,421, 91 pages.
Non-Final Office Action dated May 29, 2018 for U.S. Appl. No. 14/881,335, 63 pages.
Final Office Action dated Jun. 13, 2018 for U.S. Appl. No. 15/191,877, 33 pages.
Notice of Allowance dated May 21, 2018 for U.S. Appl. No. 15/344,468, 45 pages.
Non-Final Office Action dated Aug. 27, 2018 for U.S. Appl. No. 16/006,942, 24 pages.
Notice of Allowance dated Oct. 19, 2018 for U.S. Appl. No. 14/704,949, 38 pages.
Ouyang, Y. & Fallah, M. H., "The Impact of Cell Site Re-homing on the Performance of UMTS Core Networks", International Journal of Next Generation Network (IJ NGN), vol. 2, No. 1, Mar. 2010.
Final Office Action dated Nov. 8, 2018 for U.S. Appl. No. 14/881,335, 68 pages.
Non-Final Office Action dated Nov. 19, 2018 for U.S. Appl. No. 16/108,060, 27 pages.
Final Office Action dated Nov. 27, 2018 for U.S. Appl. No. 15/629,366, 177 pages.
Non-Final Office Action dated Sep. 24, 2018 for U.S. Appl. No. 15/996,203, 21 pages.
Final Office Action dated Jan. 31, 2019 for U.S. Appl. No. 16/006,942, 112 pages.
Final Office Action dated Mar. 6, 2019 for U.S. Appl. No. 15/996,203, 117 pages.
Non-Final Office Action dated Mar. 20, 2019 for U.S. Appl. No. 15/629,366, 26 pages.
Non-Final Office Action received for U.S. Appl. No. 16/434,164 dated Jul. 22, 2019, 24 pages.
Notice of Allowance received for U.S. Appl. No. 15/996,203 dated Aug. 19, 2019, 18 pages.
Office Action dated Oct. 18, 2019 for U.S. Appl. No. 15/917,348, 118 pages.
Final Office Action dated Apr. 3, 2014 for U.S. Appl. No. 13/188,295, 37 pages.
Non-Final Office Action dated Apr. 8, 2014 for U.S. Appl. No. 13/175,199, 52 pages.
Non-Final Office Action dated Apr. 23, 2014 for U.S. Appl. No. 13/291,917, 29 pages.
Non-Final Office Action dated Apr. 22, 2014 for U.S. Appl. No. 13/447,069, 51 pages.
Non-Final Office Action dated Sep. 20, 2012 for U.S. Appl. No. 12/870,254, 29 pages.
Non-Final Office Action dated May 14, 2014 for U.S. Appl. No. 13/660,689, 62 pages.
Final Office Action dated May 9, 2014 for U.S. Appl. No. 13/188,136, 43 pages.
Squires, "Practical Physics", Cambridge University Press, p. 12, 1986, 3 pages.
Represent. (2000). In Collins English dictionary. Retrieved on May 9, 2014 from http://search.credoreference.com/content/entry/hcengdict/represent/, 2 pages.
Represent. (2001). In Chambers 21st century dictionary. Retrieved on May 9, 2014 from http://search.credoreference.com/content/entry/chambdict/represent/.
Represent. (2011). In The american heritage dictionary of the english language. Retrieved on May 9, 2014 from http://search.credoreference.com/content/entry/hmdictenglang/represent/.
Non-Final Office Action dated May 20, 2014 for U.S. Appl. No. 13/551,369 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Non-Final Office Action dated Jun. 18, 2014 for U.S. Appl. No. 13/305,276, 26 pages.
Non-Final Office Action dated Jun. 26, 2014 for U.S. Appl. No. 13/557,425, 24 pages.
Non-Final Office Action dated Jun. 30, 2014 for U.S. Appl. No. 13/305,267, 44 pages.
Notice of Allowance dated Jul. 7, 2014 for U.S. Appl. No. 13/188,295, 51 pages.
Non-Final Office Action dated Jul. 22, 2014 for U.S. Appl. No. 12/958,146, 38 pages.
Notice of Allowance dated Jul. 22, 2014 for U.S. Appl. No. 13/525,065, 82 pages.
Notice of Allowance dated Jul. 22, 2014 for U.S. Appl. No. 13/188,300, 49 Pages.
Non-Final Office Action dated Aug. 8, 2014 for U.S. Appl. No. 13/284,497, 48 pages.
Non-Final Office Action dated Aug. 11, 2014 for U.S. Appl. No. 14/279,176, 22 pages.
Notice of Allowance dated Aug. 21, 2014 for U.S. Appl. No. 13/447,069, 78 pages.
Final Office Action dated Aug. 28, 2014 for U.S. Appl. No. 13/526,988, 83 pages.
Final Office Action dated Sep. 22, 2014 for U.S. Appl. No. 13/175,199, 62 pages.
Non-Final Office Action dated Oct. 17, 2014 for U.S. Appl. No. 13/204,535, 47 pages.
Non-Final Office Action dated Oct. 20, 2014 for U.S. Appl. No. 13/494,959, 64 pages.
Final Office Action dated Oct. 22, 2014 for U.S. Appl. No. 13/557,425, 59 pages.
Final Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Final Office Action dated Dec. 11, 2014 for U.S. Appl. No. 13/447,072, 28 pages.
Non-Final Office Action dated Dec. 1, 2014 for U.S. Appl. No. 13/495,756, 76 pages.
Non-Final Office Action dated Jan. 7, 2015 for U.S. Appl. No. 13/557,425, 30 pages.
Notice of Allowance dated Jan. 21, 2015 for U.S. Appl. No. 13/495,391, 98 pages.
Notice of Allowance dated Feb. 6, 2015 for U.S. Appl. No. 13/204,535, 20 pages.
Non-Final Office Action dated Feb. 13, 2015 for U.S. Appl. No. 14/516,286, 62 pages.
Non-Final Office Action dated Feb. 13, 2015 for U.S. Appl. No. 13/188,136, 44 pages.

(56) References Cited

OTHER PUBLICATIONS

Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVeriagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Non-Final Office Action dated Apr. 16, 2015 for U.S. Appl. No. 14/521,431, 82 Pages.
Notice of Allowance dated Mar. 19, 2015 for U.S. Appl. No. 13/494,959, 41 Pages.
Notice of Allowance dated Mar. 26, 2015 for U.S. Appl. No. 14/276,688, 90 pages.
Final Office Action dated May 1, 2015 for U.S. Appl. No. 13/557,425, 33 pages.
Non-Final Office Action dated May 14, 2015 for U.S. Appl. No. 14/530,605, 72 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews. com, Jan. 18, 2009. http://www.foxnews.com/printer_friendly_story/0,3566,480585,00.html Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary? doi=10.1. 1.21.3818. Last accessed Dec. 24, 2010, 9 pages.
Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages.
Drucker, et al., "Support Vector Regression Machine", .http://scholar.google.com/scholar?q=%22Support+Vector+Regression+Machines.%22. Last accessed Dec. 24, 2010, 7 pages.
Suykens et al. "Least squares support vector machine classifiers", Neural Processing Letters, vol. 9, No. 3, Jun. 1999, pp. 293-300.
Ferris et al. (2002). "Interior-point methods for Massive Support Vector Machines". SIAM Journal on Optimization 13: 783-804. doi:10.1137/S1052623400374379.
Meyer et al. "The support vector machine under test." Neurocomputing 55(1-2): 169-186, 2003.
International Search Report and Written Opinion for PCT Application No. PCT/US2011/026122 dated Jun. 10, 2011, 9 pages.
International Search Report and Written Opinion for PCT Application No. PCT/US2011/026120 dated Jun. 9, 2011, 11 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based- . . . 1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att, 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/sell-phone-networks-and-the-future- . . . 15 pages.
Intelligent Transportation System. Published online http://en.wikipedia.org/wiki/Intelligent_transportation_system. Retrieved on Aug. 15, 2011, 7 pages.
Koukoumidis et al., "SignalGuru: Leveraging Mobile Phones for Collaborative Traffic Signal Schedule Advisory." MobiSys'11, Jun. 28-Jul. 1, 2011, Bethesda, Maryland, USA, Copyright 2011 ACM 978-1-4503-0643-0/11/06. Retrieved on Nov. 19, 2011, 14 pages.
Bitcarrier Technology. Published online at http://www.bitcarrier.com/technology. Retrieved on Aug. 15, 2011, 1 page.
Hao et al., "Estimating Vehicle Position in a Queue at Signalized Intersections Using Simple Travel Times from Mobile Sensors." Retrieved on Nov. 19, 2011, 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Non-Final Office Action dated Dec. 28, 2011 for U.S. Appl. No. 12/836,471, 34 pages.
Non-Final Office Action dated Feb. 23, 2012 for U.S. Appl. No. 12/967,747, 31 pages.
Non-Final Office Action dated Dec. 15, 2011 for U.S. Appl. No. 12/712,424, 34 pages.
Non-Final Office Action dated Apr. 13, 2012 for U.S. Appl. No. 12/416,853, 36 pages.
Non-Final Office Action dated Oct. 2, 2012 for U.S. Appl. No. 13/554,285, 19 pages.
Non-Final Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Final Office Action dated Jul. 30, 2012 for U.S. Appl. No. 12/967,747, 28 pages.
Non-Final Office Action dated Jul. 17, 2012 for U.S. Appl. No. 13/220,083, 57 pages.
Non-Final Office Action dated Sep. 11, 2012 for U.S. Appl. No. 13/188,345, 44 pages.
Non-Final Office Action dated Oct. 15, 2012 for U.S. Appl. No. 13/523,778, 21 pages.
Final Office Action dated Dec. 20, 2012 for U.S. Appl. No. 12/958,146, 23 pages.
Non-Final Office Action dated Dec. 28, 2012 for U.S. Appl. No. 13/188,295, 37 pages.
Non-Final Office Action dated Jan. 3, 2013 for U.S. Appl. No. 13/188,300, 36 pages.

(56) References Cited

OTHER PUBLICATIONS

Non-Final Office Action dated Nov. 8, 2012 for U.S. Appl. No. 13/204,535, 30 pages.
Final Office Action dated Jan. 25, 2013 for U.S. Appl. No. 13/554,285, 20 pages.
Non-Final Office Action dated Mar. 19, 2013 for U.S. Appl. No. 13/174,541, 46 pages.
Final Office Action dated Feb. 13, 2013 for U.S. Appl. No. 13/220,083, 48 pages.
Final Office Action dated Feb. 22, 2013 for U.S. Appl. No. 13/188,345, 45 pages.
Final Office Action dated Mar. 15, 2013 for U.S. Appl. No. 13/204,535, 18 pages.
Non-Final Office Action dated Mar. 19, 2013 for U.S. Appl. No. 13/284,497, 46 pages.
Non-Final Office Action dated Apr. 19, 2013 for U.S. Appl. No. 13/277,595, 58 pages.
Office Action dated Jun. 30, 2020 for U.S. Appl. No. 16/881,068, 101 pages.
Non-Final Office Action dated Jun. 1, 2015 for U.S. Appl. No. 13/447,072, 38 pages.
Final Office Action dated Jun. 2, 2015 for U.S. Appl. No. 14/516,286, 20 pages.
Non-Final Office Action dated May 20, 2015 for U.S. Appl. No. 13/526,988, 52 pages.
Final Office Action dated Jun. 9, 2015 for U.S. Appl. No. 13/495,756, 35 pages.
Notice of Allowance dated Jul. 8, 2015 for U.S. Appl. No. 14/548,901, 146 pages.
Buford, et al., "Location Privacy Enforcement in a Location-Based Services Platform", 6th IEEE Consumer Communications and Networking Conference, Jan. 2009. Retrieved on Jul. 8, 2015, 5 pages.
Philips, Jr. et al., "Information Sharing and Security in Dynamic Coalitions", SACMAT '02 Proceedings of the seventh ACM symposium on Access control models and technologies, 2002. Retrieved on Jul. 8, 2015, 10 pages.
Moniruzzaman, et al., "A Study of Privacy Policy Enforcement in Access Control Models", Proceedings of 13th International Conference on Computer and Information Technology, Dec. 2010, Retrieved on Jul. 8, 2015, 6 pages.
Final Office Action dated Jul. 22, 2015 for U.S. Appl. No. 13/188,136, 32 Pages.
"CELL_DCH", in INACON Glossary, published online at [http://www.inacon.de/glossary/CELL_DCH.php] retrieved on Jul. 22, 2015, 1 page.
Non-Final Office Action dated Sep. 17, 2015 for U.S. Appl. No. 13/495,756, 23 Pages.
Non-Final Office Action dated Sep. 14, 2015 for U.S. Appl. No. 13/557,425, 32 Pages.
Non-Final Office Action dated Sep. 18, 2015 for U.S. Appl. No. 14/641,247, 69 pages.
Notice of Allowance dated Aug. 27, 2015 for U.S. Appl. No. 14/521,431, 39 pages.
Non-Final Office Action dated Nov. 16, 2015 for U.S. Appl. No. 13/188,136, 33 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Non-Final Office Action dated Nov. 23, 2015 for U.S. Appl. No. 14/520,287, 80 pages.
Non-Final Office Action dated Nov. 16, 2015 for U.S. Appl. No. 14/566,657, 87 pages.
Final Office Action dated Nov. 30, 2015 for U.S. Appl. No. 13/447,072, 45 pages.
Non-Final Office Action dated Dec. 18, 2015 for U.S. Appl. No. 14/548,901, 35 pages.
Non-Final Office Action dated Dec. 31, 2015 for U.S. Appl. No. 14/952,609, 32 pages.
Final Office Action dated Dec. 1, 2015 for U.S. Appl. No. 13/526,988, 43 pages.
Non-Final Office Action dated Jan. 11, 2016 for U.S. Appl. No. 13/175,199, 29 pages.
Non-Final Office Action dated Mar. 11, 2016 for U.S. Appl. No. 14/743,076, 86 pages.
Notice of Allowance dated Mar. 16, 2016 for U.S. Appl. No. 14/520,287, 23 pages.
Non-Final Office Action dated Mar. 18, 2016 for U.S. Appl. No. 13/447,072, 37 pages.
Final Office Action dated Apr. 5, 2016 for U.S. Appl. No. 13/188,136, 33 pages.
Non-Final Office Action dated Apr. 13, 2016 for U.S. Appl. No. 14/877,915, 76 pages.
Non-Final Office Action dated May 17, 2016 for U.S. Appl. No. 15/074,622, 18 pages.
Final Office Action dated Jun. 10, 2016 for U.S. Appl. No. 14/548,901, 33 pages.
Non-Final Office Action dated Jun. 22, 2016 for U.S. Appl. No. 14/970,533, 84 pages.
Non-Final Office Action dated Jun. 28, 2016 for U.S. Appl. No. 15/132,220, 17 pages.
Notice of Allowance dated Jul. 19, 2016 for U.S. Appl. No. 14/952,609, 99 pages.
Non-Final Office Action dated Aug. 24, 2016 for U.S. Appl. No. 14/676,066, 107 pages.
Final Office Action dated Aug. 25, 2016 for U.S. Appl. No. 13/447,072, 38 pages.
Non-Final Office Action dated Sep. 30, 2016 for U.S. Appl. No. 14/957,525, 72 pages.
Notice of Allowance dated Oct. 7, 2016 for U.S. Appl. No. 14/548,901, 45 pages.
Final Office Action dated Oct. 12, 2016 for U.S. Appl. No. 14/877,915, 34 pages.
Notice of Allowance dated Nov. 16, 2016 for U.S. Appl. No. 15/186,410, 80 pages.
Non-Final Office Action dated Dec. 28, 2016 for U.S. Appl. No. 13/447,072, 34 pages.
Non-Final Office Action dated Feb. 14, 2017 for U.S. Appl. No. 14/641,242, 120 pages.
Non-Final Office Action dated Jan. 13, 2017 for U.S. Appl. No. 14/601,800, 95 pages.
Non-Final Office Action dated Jan. 26, 2017 for U.S. Appl. No. 14/877,915, 30 pages.
Non-Final Office Action dated Feb. 15, 2017 for U.S. Appl. No. 15/191,877, 104 pages.
Non-Final Office Action dated Feb. 27, 2017 for U.S. Appl. No. 15/132,220, 91 pages.
Notice of Allowance dated Apr. 10, 2017 for U.S. Appl. No. 14/676,066, 33 pages.
Notice of Allowance dated May 8, 2017 for U.S. Appl. No. 15/466,853, 18 pages.
Notice of Allowance dated May 19, 2017 for U.S. Appl. No. 15/261,841, 83 pages.
Final Office Action dated Jun. 19, 2017 for U.S. Appl. No. 13/447,072, 47 pages.
Final Office Action dated Jun. 12, 2017 for U.S. Appl. No. 15/132,220, 25 pages.
Non-Final Office Action dated Dec. 12, 2019 for U.S. Appl. No. 16/114,918, 70 pages.
Notice of Allowance received for U.S. Appl. No. 16/434,164 dated Nov. 6, 2019, 99 pages.
Notice of Allowance received for U.S. Appl. No. 15/917,348 dated Jan. 31, 2020, 22 pages.
U.S. Appl. No. 16/434,164, filed Jun. 6, 2019.
U.S. Appl. No. 16/108,060, filed Aug. 21, 2018.
U.S. Appl. No. 15/603,416, filed May 23, 2017.
U.S. Appl. No. 14/957,525, filed Dec. 2, 2015.
U.S. Appl. No. 14/530,605, filed Oct. 31, 2014.
U.S. Appl. No. 13/291,917, filed Nov. 8, 2011.

\* cited by examiner

LOCATION BASED SHARING OF A NETWORK ACCESS CREDENTIAL

RELATED APPLICATIONS

This application is a continuation of, and claims priority to each of, U.S. patent application Ser. No. 16/434,164, filed on 6 Jun. 2019, and entitled "LOCATION BASED SHARING OF A NETWORK ACCESS CREDENTIAL," which is a continuation of U.S. patent application Ser. No. 16/108,060, filed on 21 Aug. 2018, now issued as U.S. Pat. No. 10,362,066, and entitled "LOCATION BASED SHARING OF A NETWORK ACCESS CREDENTIAL," which is a continuation of U.S. patent application Ser. No. 15/603,416, filed on 23 May 2017, now issued as U.S. Pat. No. 10,084,824, and entitled "LOCATION BASED SHARING OF A NETWORK ACCESS CREDENTIAL," which is a continuation of U.S. patent application Ser. No. 14/957,525, filed on 2 Dec. 2015, now issued as U.S. Pat. No. 9,667,660, and entitled "LOCATION BASED SHARING OF A NETWORK ACCESS CREDENTIAL," which is a continuation of U.S. patent application Ser. No. 14/530,605, filed on 31 Oct. 2014, now issued as U.S. Pat. No. 9,232,399, and entitled "LOCATION BASED SHARING OF A NETWORK ACCESS CREDENTIAL," which is a continuation of U.S. patent application Ser. No. 13/291,917, filed on 8 Nov. 2011, now issued as U.S. Pat. No. 8,909,247, and entitled "LOCATION BASED SHARING OF A NETWORK ACCESS CREDENTIAL." The entireties of the aforementioned applications are hereby incorporated by reference herein.

TECHNICAL FIELD

The disclosed subject matter relates to network access credentials and, more particularly, to sharing network access credentials.

BACKGROUND

Conventional sources of location information for mobile devices are based on a wide variety of location determination technologies, such as global positioning system (GPS) technology, triangulation, multilateration, etc. These sources of data have provided the opportunity to capture location information for a device and share it with another device, which can allow non-location enabled devices to participate, at some level, in location-centric services. In contrast to conventional systems that rely on technologies such as GPS, triangulation, multilateration, etc., the use of timed fingerprint location (TFL) technology can provide advantages over the conventional technologies. For example, GPS is well known to be energy intensive and to suffer from signal confusion in areas with interference between the satellite constellation and the GPS enabled device. Further, GPS is simply not available on many mobile devices, especially where the devices are cost sensitive. Multilateration and triangulation technologies are computationally intensive, which can result in processing time issues and a corresponding level of energy consumption.

The above-described deficiencies of conventional mobile device location data sources for transportation analytics is merely intended to provide an overview of some of the problems of current technology, and are not intended to be exhaustive. Other problems with the state of the art, and corresponding benefits of some of the various non-limiting embodiments described herein, may become further apparent upon review of the following detailed description.

DETAILED DESCRIPTION

Figure 1:
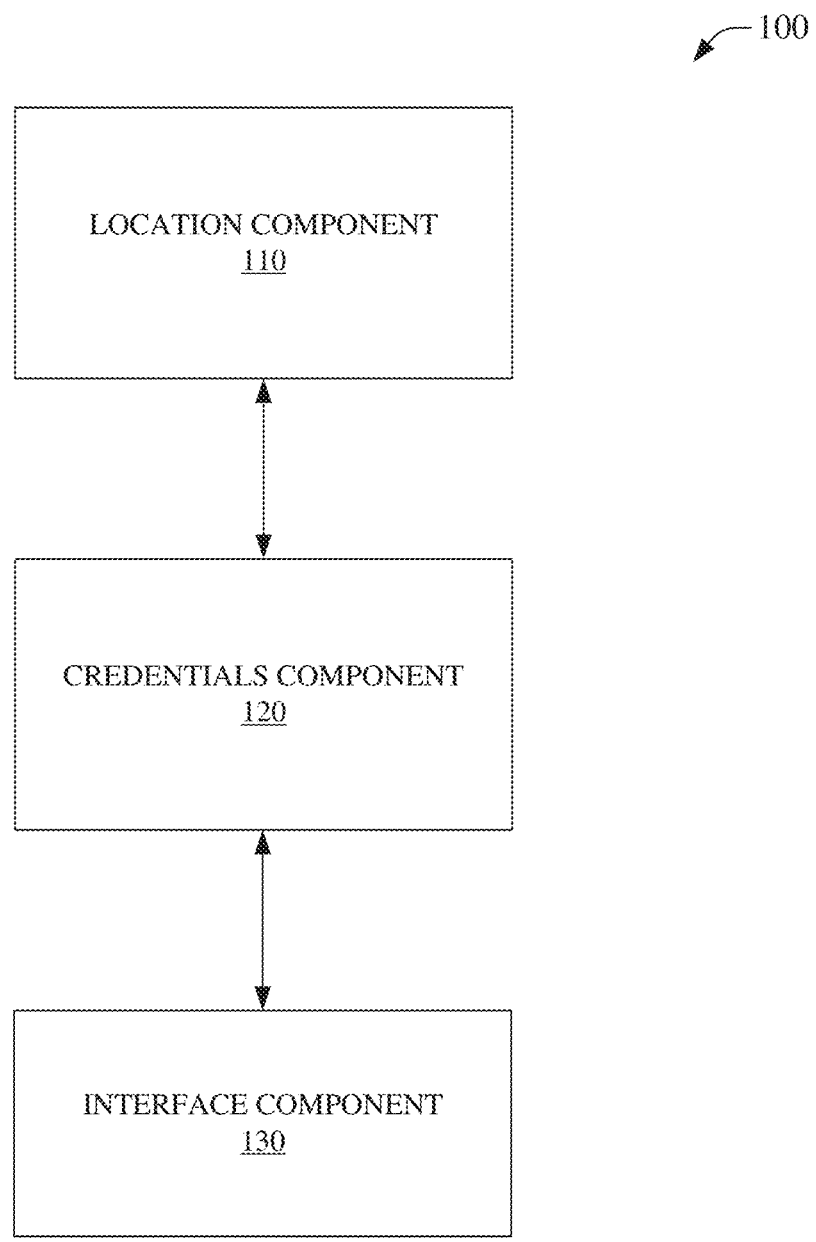
FIG. 1 is an illustration of a system that facilitates sharing a network access credential based on location information in accordance with aspects of the subject disclosure.

The presently disclosed subject matter illustrates sharing a network access credential based on location information. Location information can be determined from timed fingerprint location (TFL) information. Similarly, location information can be determined from GPS information, multilateration, triangulation, etc., though TFL information can provide advantages over these more conventional location determination technologies, as disclosed herein.

Sharing network access credentials can allow devices to access a network based on the shared credential. This can be advantageous over acquiring new credentials. As an example, where a first user equipment (UE) has network access credentials for a local area network (LAN), these network access credentials can be shared with a second UE to allow the second UE to access the LAN. This can eliminate, for example, the need to go through a registration process for new credentials for the second UE. Given that several network access credentials can be associated with the first UE, these credentials can be related to the location of the UE, such as a network access credential for a home LAN, a work LAN, a school LAN, an access point at a local coffee shop, etc. Selection of a network access credential to share can be based on a location, for example, the UE can share the home LAN network access credential when the UE is located in a region associated with the home LAN. TFL information can be employed advantageously in determining a location as a basis for receiving a network access credential.

TFL information can include location information or timing information as disclosed in more detail in U.S. Ser. No. 12/712,424 filed Feb. 25, 2010, which application is hereby incorporated by reference in its entirety. Further, such information can be accessed from active state or idle state user equipment as disclosed in more detail in U.S. Ser. No. 12/836,471, filed Jul. 14, 2010, which application is also hereby incorporated by reference in its entirety. As such, TFL information component can facilitate access to location information or timing information for a mobile device or user equipment (UE) in an active or idle state. TFL information can be information from systems in a timed fingerprint location wireless environment, such as a TFL component of a wireless telecommunications carrier. As a non-limiting example, UEs, including mobile devices not equipped with a GPS-type system, can be associated with TFL information, which can facilitate determining a location for a UE based on the timing information associated with the UE.

In an aspect, TFL information can include information to determine a differential value for a NodeB site pair and a bin grid frame, as disclosed in more detail in incorporated U.S. Ser. No. 12/712,424. A centroid region (possible locations between any site pair) for an observed time value associated with any NodeB site pair (NBSP) can be calculated and is related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors.

Moreover, whereas TFL can be operable in a wide array of current and legacy devices without any substantial dependence on GPS technologies, a greater number of mobile devices can act as TFL source devices than would be expected for GPS-enabled devices at the current time. A greater number of data sources are generally considered desirable in facilitating access to location information. Further, where TFL information can be employed in a lookup of location data sets, TFL can be much less computationally intense than triangulation or multilateration technologies. Reduced computational load is generally desirable in UE devices. TFL can piggyback on timing signals employed in wireless telecommunications, which systems are already deployed. A reduced need to rollout additional hardware is generally considered desirable. Additionally, by piggybacking on existing timing signals and by reducing the computational load, TFL can be associated with minimal additional energy expenditure in sharp contrast to GPS or triangulation/multilateration technologies. Reduced energy expenditure is generally related to a reduced battery drain in mobile devices and is typically a highly desirable trait.

Various embodiments relate to sharing a network access credential based on location. In one example embodiment, a system comprises a location component that receives location information. The exemplary system further comprises a credential component to determine a network access credential based on the location information. The network access credential can be distributed by way of an interface component.

In a further embodiment, a method comprises receiving location information. The location information can be for a user equipment. The example method further comprises receiving a network access credential based on the location information. The network access credential can then be accessed in the exemplary method.

In another example embodiment, a computer-readable storage medium comprises instructions for receiving location information for a first user equipment and receiving a network access credential based on the location information. The computer-readable storage medium further comprises instructions for allowing access to the network access credential. The access can be based on an aspect of a request for access. The request for access can be related to a second user equipment.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates sharing a network access credential based on location information in accordance with aspects of the subject disclosure. System 100 can include location component 110. Location component 110 can facilitate access to location information. Location information can be received from GPS components, multilateration components, triangulation components, or any other location information technology. In an embodiment, TFL information can be a source of location information, e.g., location information derived from TFL timing information, or can be a source of TFL timing information that can facilitate determining a location. TFL timing information can be for one or more NBSPs. TFL information can be derived from timing associated with one or more NBSPs.

Location component 110 can be communicatively coupled with credentials component 120. Credentials component 120 can select a network access credential based on location information. Location information can be correlated with one or more network access credentials. Based on a location, one or more selected network access credentials, e.g., network access credentials correlated with location information, can be determined to be relevant. One or more of these relevant network access credentials can be made available to be shared with another device. The shared network access credential can be employed to facilitate access to the related network by the device with which the network access credential was shared.

In an embodiment, credentials component 120 can determine a permission related to access of the one or more relevant network access credentials. The permission can be based on nearly any metric. As an example, the permission can be based on information related to a network related to the relevant network access credential, for instance, the network can be designated as "do not share" which can lead to a permission prohibiting sharing of the relevant network access credential. As a second example, the network can be designated as "share with predetermined list A" which can lead to a permission allowing sharing of the network access credential with any device indicated on "list A". As a third example, the permission can be based on time of day, for instance, a permission can allow sharing in "off-peak" times. As a fourth example, the permission can be associated with particular user inputs, for instance, a password, a user identity, a personal identification number, a kinetic action, etc. The exemplary kinetic action, for instance, can be the act of "bumping" a first UE with a second UE, e.g., emulating a fist-bump action between the two devices, to designate that there is an affirmative permission to share the relevant network access credential between the first and second UE. Numerous other examples are within the scope of the present subject matter despite not being explicitly recited for the sake of clarity and brevity.

In an embodiment, credentials component 120 can be local with regard to location component 110 or interface component 130. As an example, system 100 can be embodied in a cellular phone and can include credentials component 120 as a component of the cellular phone. In this example, a network access credential correlated with location information can be selected by credentials component 120 at the cellular phone. This credential can then be shared, for instance, with another cellular phone, laptop computer, tablet computer, smartphone, etc.

In another embodiment, credentials component 120 can be remote with regard to location component 110 or interface component 130. As another example, credentials component 120 can be embodied in a corporate server remote from location component 110 or interface component 130 that, for instance, can be embodied in a tablet computer. In this example, location information, such as TFL location information, can be received at the tablet computer and communicated to the corporate server such that credentials component can determine a network access credential based on the location information from tablet computer. This network access credential can then be shared for instance, with another cellular phone, laptop computer, tablet computer, smartphone, etc. As an example, a smartphone can enter a corporate campus having a credentials component 120 embodied in a corporate server. As the smartphone enters the corporate campus, the location information can be communicated to the corporate server. This location information can indicate that the smartphone is in an area served by a corporate local area network (LAN). Based on the location information indicating that the smartphone is within the area served by the LAN, a set of LAN access credentials can be selected by credentials component 120. These credentials can be communicated to the smartphone and can facilitate the smartphone accessing the LAN. It will be noted that the selection of the credentials in this example is by location and not by actually detecting the LAN itself. As such, where the smartphone has a Wi-Fi radio for accessing the LAN, this radio can be turned off while credentials can still be accessed based on the location, for instance, a location determined by TFL information.

Credentials component 120 can be communicatively coupled with interface component 130. Interface component 130 can facilitate interaction with credentials component 120 from other devices, for instance, a UE, laptop computer, tablet computer, access point, femto-cell, etc. In an embodiment, interface component 130 can include a short-range communications interface to facilitate communication of a network access credential or request for sharing a network access credential with devices, e.g., UEs, in a region associated with a first device, e.g., a first UE. As an example, interface component 130 can include Bluetooth components that can facilitate wirelessly sharing a network access credential by way of Bluetooth between a smartphone and a tablet computer. As a second example, interface component 130 can include 802.xx components, e.g., 802.11b, 802.11g, 802.11n, ZigBee, etc., that can facilitate wirelessly sharing a network access credential by way of the 802.xx technology between two laptop computers. As a third example, interface component 130 can include 802.xx components that can facilitate wirelessly sharing a network access credential by way of the 802.xx technology between a tablet computer and an access point, e.g., a Wi-Fi hotspot, corporate wireless LAN access point, etc. Short-range communications can include other technologies with effective wireless ranges up to about 500 meters, though more typically on the order of meters to tens of meters.

Figure 2:
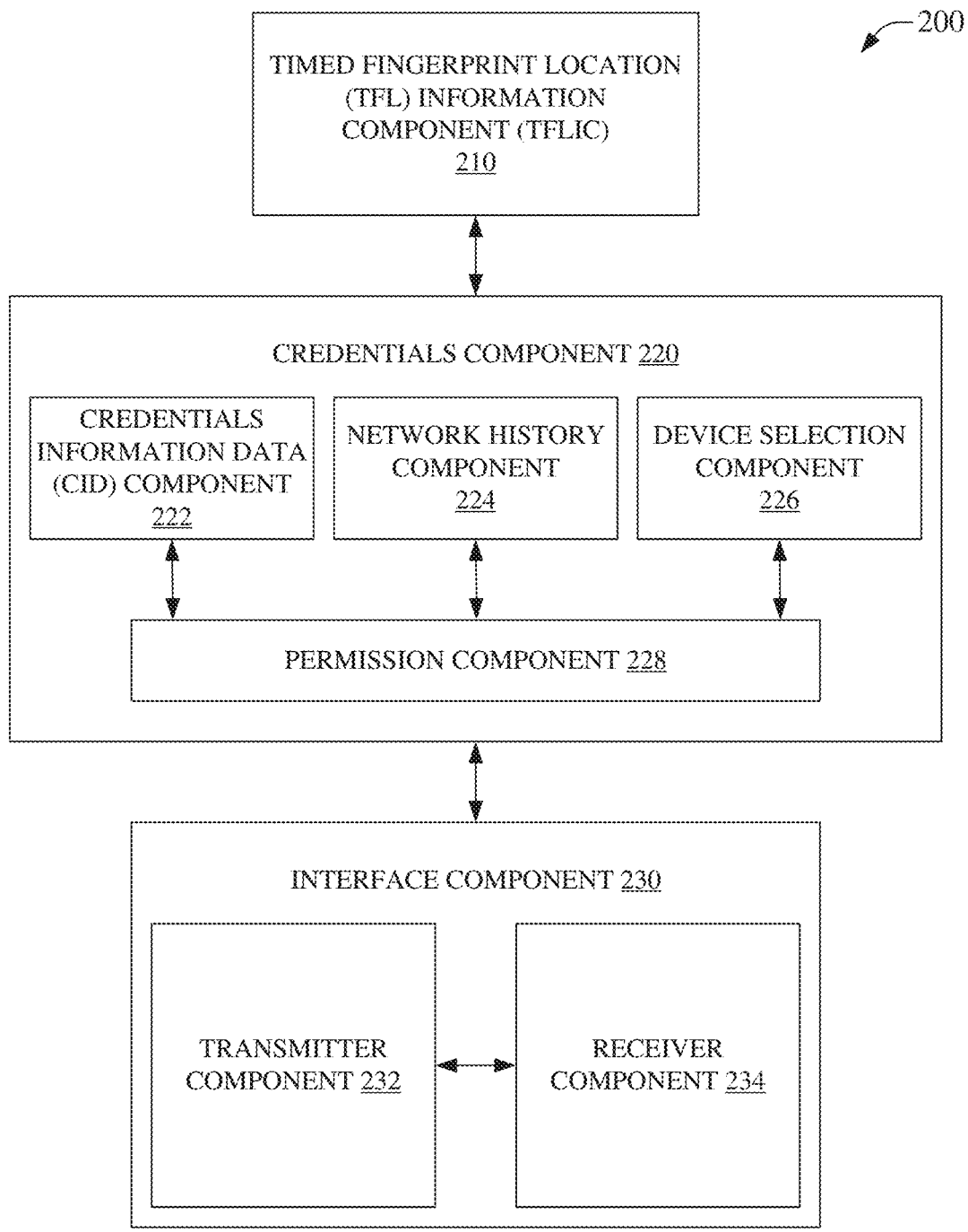
FIG. 2 is a depiction of a system that facilitates sharing a network access credential based on timed fingerprint location information in accordance with aspects of the subject disclosure.

FIG. 2 is a depiction of a system 200, which can facilitate sharing a network access credential based on timed fingerprint location information in accordance with aspects of the subject disclosure. System 200 can include timed fingerprint location information component (TFLIC) 210. TFLIC 210 can facilitate access to location information. In an embodiment, TFL information can be location information, e.g., location information derived from TFL timing information, or can be TFL timing information that can facilitate determining a location. TFL timing information can be for one or more NBSPs. TFL information can be derived from timing associated with one or more NBSPs.

TFLIC 210 can be communicatively coupled with credentials component 220. Credentials component 220 can select a network access credential based on location information. Location information can be correlated with one or more network access credentials. Based on a location, one or more selected network access credentials can be determined to be relevant. One or more of these relevant network access credentials can be made available to be shared with another device.

Credentials component 220 can include credentials information data (CID) component 222. CID component 222 can facilitate access to credentials information data. Credentials information data can include a network access key, e.g., wired equivalent privacy (WEP) key, Wi-Fi protected access (WPA) or Wi-Fi protected access II (WPA2) key, counter mode with cipher block chaining message authentication code protocol (CCMP) key, advanced encryption standard (AES) key, etc.; service set identifier (SSID) information; network name, network location information, e.g., lat/long, address, range information, etc.; or other information associated with accessing a network. A network access credential can include credentials information data to facilitate access to the associated network. As an example, a network access credential can include an SSID and WPA2 key that can be used by a UE to identify and access the network associated with the SSID.

Credentials component 220 can include network history component 224. Network history component 224 can facilitate access to historical network access information. Historical network access information can include data on nearly any aspect of accessing a network. As examples, historical network access information can include one or more of historical dates of network access, lengths of access, data throughput for a network access connection, quality of service or level of service for a network access connection, count of instances a network access connection has been accessed successfully/unsuccessfully/total, data on security protocols for a network access connection, cost of use for network access, etc. Numerous other examples of historical network access information will fall within the scope of the subject disclosure despite not being explicitly recited herein for clarity and brevity. Historical network access information can be employed in selecting relevant network access credentials. As an example, where two network access credentials are selected based on location information, a history of poor performance for one of the networks can reduce the relevance of that network with regard to the other network. Credentials for this less relevant network can be less likely to be shared.

Credentials component 220 can include device selection component 226. Device selection component 226 can facilitate selection of appropriate devices with which network access credentials can be shared. As an example, device selection component 226 can indicate that only devices that can be identified as belonging to a designated user can be given access to shared network access credentials. As a second example, device selection component 226 can designate that only devices with accounts at a particular telecommunications carrier can receive permission to access shared network access credentials. As a third example, device selection component 226 can designate that access to shared network access credentials should conform to a list of devices, for instance a list of phone numbers, customer numbers, account numbers, employee identifiers, device identifiers, account user names, etc.

Credentials component 220 can include permission component 228. Permission component 228 can be communicatively coupled to CID component 222, network history component 224, or device selection component 226. Permission component 228 can designate a permission related to accessing a network access credential. As an example, permission component 228 can designate that access to a network access credential is permitted based on a requesting device being identified and affirmatively designated by device selection component 226 and a network access credential being associated with a current location of a source device. As a second example, permission component 228 can designate that access to a network access credential is permitted based on a network access credential being designated as highly relevant and being associated with a current location of a source device. As a third example permission component 228 can designate that access to a network access credential is denied based on a requesting device not being identified by device selection component 226 even where a network access credential is associated with a current location of a source device. In an embodiment, permission can be designated based on application of a set of permission rules or algorithms to data related to a network access credential, a requesting device, a receiving device, network history, etc.

Credentials component 220 can be communicatively coupled to interface component 230 that can include a transmitter component 232 and a receiver component 234. Transmitter component 232 and receiver component 234 can facilitate sharing a network access credential. In an embodiment transmitter component 232 and receiver component 234 can facilitate sharing a network access credential over a wireless interface and, as such, can include an antenna and associated electronics for wireless communications. In another embodiment, transmitter component 232 and receiver component 234 can facilitate determining aspects of an employed wireless communications technology, such as determining a typical effective range for sharing a network access credential over a Bluetooth link. The determined effective range can then, for example, be employed in determining a permission related to sharing the network access credential.

Figure 3:
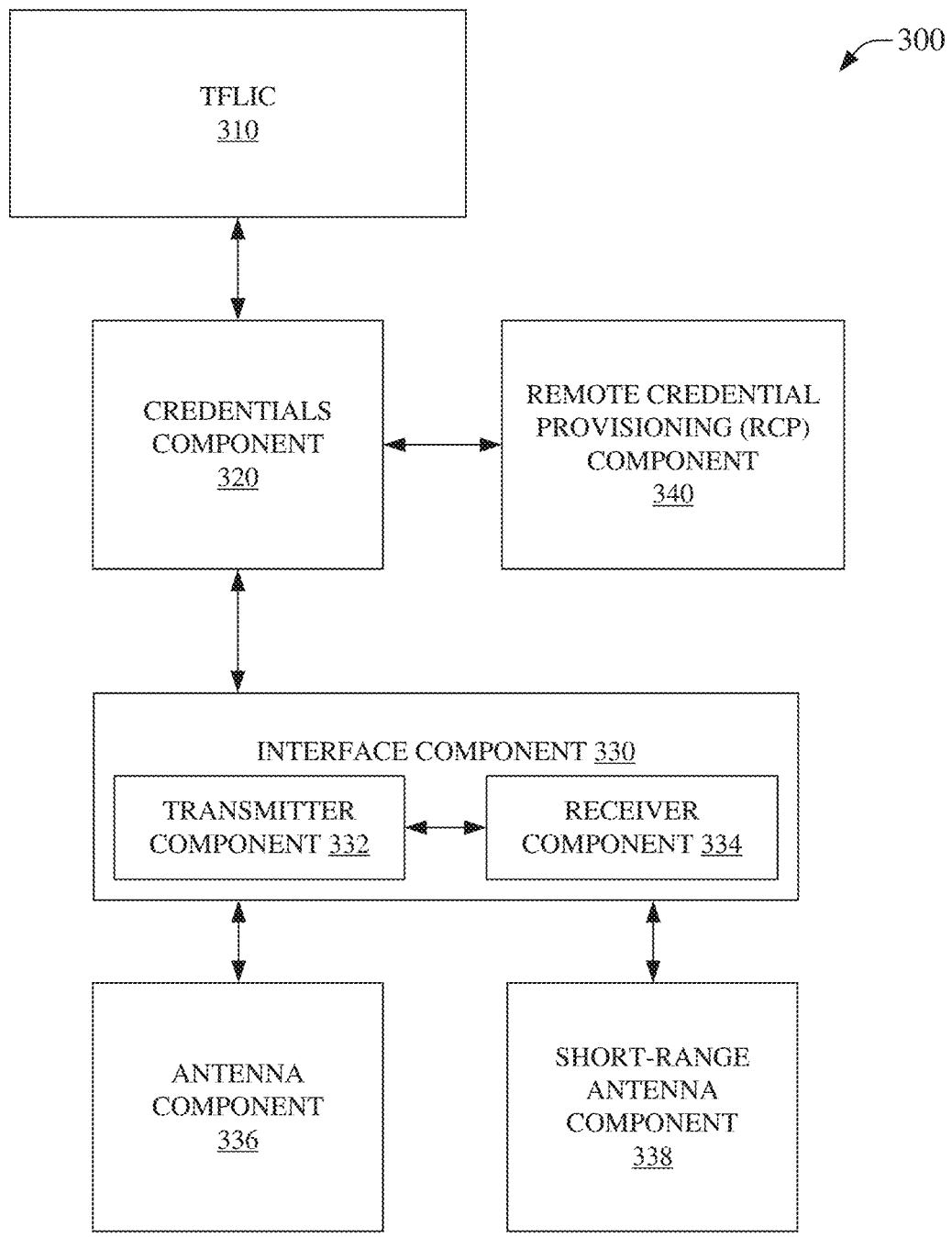
FIG. 3 illustrates a system that facilitates sharing a network access credential based on timed fingerprint location information in accordance with aspects of the subject disclosure.

FIG. 3 illustrates a system 300, which facilitates sharing a network access credential based on timed fingerprint location information in accordance with aspects of the subject disclosure. System 300 can include timed fingerprint location information component (TFLIC) 310. TFLIC 310 can facilitate access to location information. In an embodiment, TFL information can be location information, e.g., location information derived from TFL timing information, or can be TFL timing information that can facilitate determining a location. TFL timing information can be for one or more NBSPs. TFL information can be derived from timing associated with one or more NBSPs.

TFLIC 310 can be communicatively coupled with credentials component 320. Credentials component 320 can select a network access credential based on location information. Location information can be correlated with one or more network access credentials. Based on a location, one or more selected network access credentials can be determined to be relevant. One or more of these relevant network access credentials can be made available to be shared with another device. In an embodiment, credentials component 320 can be local with regard to location component 310 or interface component 330. In another embodiment, credentials component 320 can be remote with regard to location component 310 or interface component 330.

Credentials component 320 can be communicatively coupled with remote credential provisioning (RCP) component 340. In an embodiment, RCP component 340 can facilitate access to credential information data. Credential information data can include information relating to accessing a network. Credential information data can therefore include passcodes, passwords, SSIDs, keys, device identifiers, user identifiers, service provider identifiers, network identifiers, etc. As an example, RCP component 340 can be a cloud based data store including SSIDs, locations, and WEP keys. Exemplary RCP component 340 can provide access to this information from credentials component 320, which can be local to a device including TFLIC 310, such as a smartphone, or remote from a device including TFLIC 310, such as a laptop computer accessing a credentials component 320 on a corporate computer system.

In an embodiment, RCP component 340 can designate a permission related to accessing a network access credential. A permission can be designated based on application of a set of permission rules or algorithms to data related to a network access credential, a requesting device, a receiving device, network history, etc. As an example, RCP component 340 can receive an identifier and can designate a permission relating to access of a network access credential based on the identifier. In this example, for instance, a smartphone requesting sharing of a network access credential can be identified by telephone number that can be compared to a list of phone numbers allowed access to a network access credential. Where the exemplary telephone number is on the list of allowed identifiers, a permission can be set allowing the smartphone to access a shared network access credential. Where the exemplary telephone number is not on the list of allow identifiers, a permission can be set requiring additional verification before allowing access, denying access entirely, allowing access to an alternate network access credential, etc. It will be noted that numerous other examples of a permission and logic associated with determining the permission are considered within the scope of the disclosed subject matter despite not being explicitly recited for the sake of clarity and brevity.

Credentials component 320 can be communicatively coupled to interface component 330 that can include a transmitter component 332 and a receiver component 334. Transmitter component 332 and receiver component 334 can facilitate sharing a network access credential. In an embodiment, transmitter component 332 and receiver component 334 can be electronics or software for wireless communications, such as those enumerated elsewhere herein.

Interface component 330 can be communicatively coupled to antenna component 336. Antenna component 336 can facilitate communicating between UEs by way of a radio access network. As an example, UEs can communicate over a cellular telecommunications network. Antenna component 336 can include medium-range antenna components, long-range antenna components, etc. In an embodiment, antenna component 336 does not include short-range antenna components that are included in short-range antenna component 338. In some embodiments, antenna component 336 can be employed to facilitate communication between credentials component 320 and RCP component 340.

Interface component 330 can be communicatively coupled to short-range antenna component 338. Short-range antenna component 338 can facilitate communicating between UEs to facilitate sharing TFL information by way of a short-range communication technology. The short-range communication technology, for example, can be infrared, optical, Bluetooth, ZigBee, 802.xx, etc. In some embodiments, short-range antenna component 338 can be associated with predetermined transmission ranges. These transmission ranges can be, for example, associated with a personal area network that can include devices within about 1-3 meters of the short-range antenna; a home area network that can include devices within about 150 meters of the short-range antenna; a work area network that can extend out to about 500 meters of the short-range antenna, etc. Short-range communications can include technologies with effective wireless ranges up to about 500 meters, though they can more typically be on the order of meters to tens of meters. As an example, a personal area network can be limited to devices on or near a user and can, for example, be associated with a range of about 1-3 meters. The exemplary short-range antenna component 338 covering about 1-3 meters would facilitate sharing network access credentials from a source device to other devices within about 1-3 meters of the source device. This, for example, can be an efficient way of sharing network access credentials among devices of a single person, such as sharing a network access credential from a cell phone to a laptop, watch, PDA, running shoe fob, etc., of a user to enable those devices to access the network for which the user already has credentials without needing to manually enter them on each device. Other ranges can be employed and are within the scope of the present disclosure despite not being explicitly recited.

Figure 4:
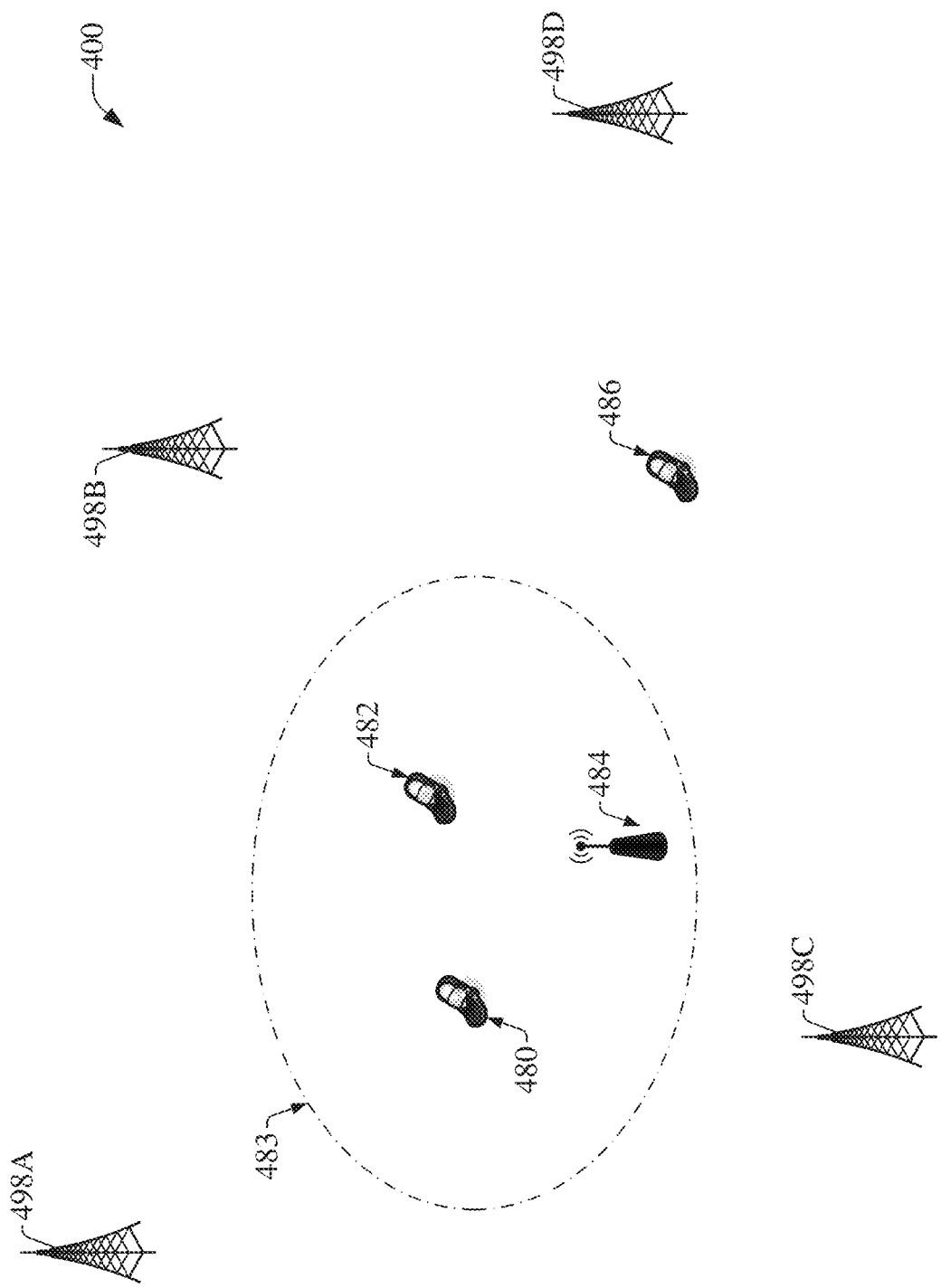
FIG. 4 illustrates an exemplary system including sharing a network access credential based on location information in accordance with aspects of the subject disclosure.

FIG. 4 is illustrates an exemplary system 400 including sharing a network access credential based on location information in accordance with aspects of the subject disclosure. System 400 can include NodeBs 498A-D. Combinations of NodeBs 498A-D can act as NBSPs for determining TFL information. UE 480 can be a TFL-enabled UE. UE 480 can acquire TFL timing or location information relative to NodeBs 498A-D. UE 480 can be associated with a short-range communication region 483. UE 480 can be a source device for sharing network access credentials. As an example, UE 480 can have network access credentials for accessing a network associated with wireless access point 484.

System 400 can further include UE 482. UE 482 can be a requesting device. As an example, UE 482 can be without access credentials for accessing wireless access point 484. UE 482 can generate a request for shared network access credentials. This request can be received by UE 480. UE 480 can determine its location, e.g., based on TFL information. The location can be correlated with a set of relevant network access credentials for a network associated with access point 484. UE 480 can then determine that the requesting device, UE 482, has permission to access the set of relevant access credentials. This permission can be based, for instance, on the wireless service provider being the same for both UE 480 and UE 482, the network associated with access point 484 being open to all users, the users of UE 480 and UE 482 doing a fist-bump kinetic action that indicates that a credentials transfer between the two "bumped" device is approved by the users, etc. The exemplary set of relevant network access credentials can then be made accessible form UE 480, for instance, by transmitting the credentials within the short-range communication region 483 with a short-range antenna component (not illustrated). UE 482 can receive the shared network access credentials. UE 482 can then employ the credentials in accessing the network associated with access point 484.

In an aspect, UE 486 can be outside the short-range communication region 483 and can thus be unable to receive the shared network access credentials. In another aspect, UE 486 can be determined not to have permission to access the shared network access credentials. Where UE 486 does not have permission, but is within range (not illustrated) transmitting the credentials in an encoded manner can facilitate preventing UE 486 from accessing the shared network access credentials. Other selective transmission techniques can also be employed, for example, emailing the credentials to an address designated by UE 482, texting the credentials to UE 482, transmitting over a more limited range that includes UE 482 but exclude UE 486, etc. These, and other techniques not explicitly recited herein for clarity and brevity, are to be considered within the scope of the presently disclosed subject matter.

Figure 5:
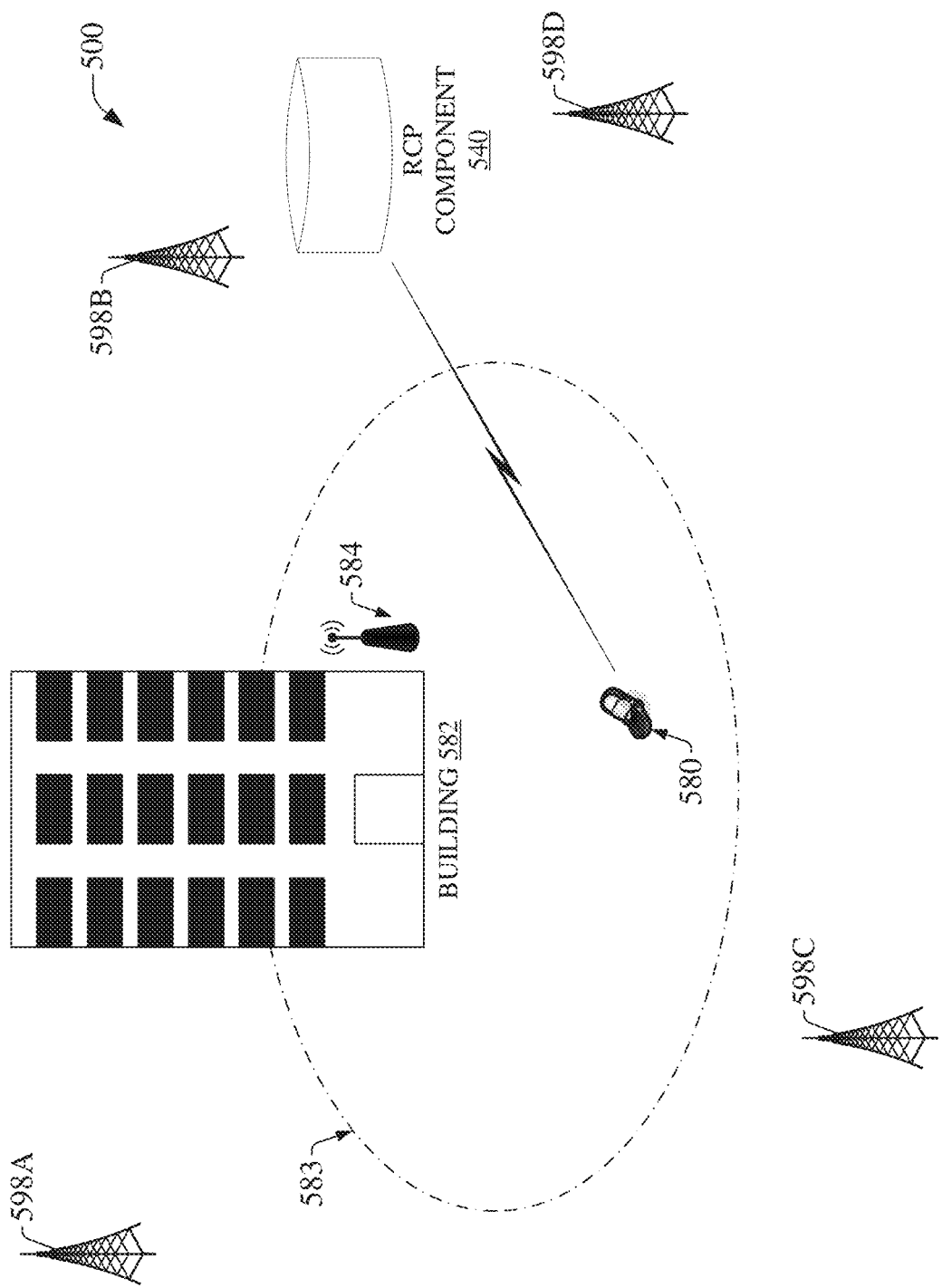
FIG. 5 illustrates an exemplary system including sharing a network access credential based on location information in accordance with aspects of the subject disclosure.

FIG. 5 illustrates an exemplary system 500 including sharing a network access credential based on location information in accordance with aspects of the subject disclosure. System 500 can include NodeBs 598A-D. Combinations of NodeBs 598A-D can act as NBSPs for determining TFL information. UE 580 can be a TFL-enabled UE. UE 580 can acquire TFL timing or location information relative to NodeBs 598A-D. UE 580 can be associated with a short-range communication region 581. UE 580 can be a TFL source device.

UE 580 can be within region 583 associated, for example, with a corporate campus for a corporation in building 582.

Access point 584 can service region 583 with access to a wireless network. UE 580 can be communicatively connected to RCP component 540. Further, UE 580 can request network access data from RCP component 540 based on the location of UE 580 within region 583. The location of UE 580 within region 583 can be determined from location data, e.g., TFL information.

In an embodiment, RCP component 540 can be embodied in a computing system remote from UE 580. UE 580 can be associated with a permission for access to a network access credential. As an example, UE 580 can be a corporate issued smartphone that can have a subscriber identity module (SIM). The SIM information can be received by RCP component 540. The SIM information can be compared to a list of corporate devices with permission to access the network associate with access point 584. Where the SIM information matches an identified and approved device, a network access credential can be shared with UE 580. Sharing the network access credential can be by any appropriate communications protocol, for instance, texting, encrypted transmission, email, etc.

In some embodiments, RCP component 540 can be remote from both UE 580 and building 582. RCP component 540 can be administered by a third party. As examples, RCP component 540 can be a cloud based component; RCP component 540 can be a corporate computing element located in a foreign country; RCP component 540 can be a corporate computing element administered by a vendor company; etc.

FIGS. 4 and 5 are presented only to better illustrate some of the benefits of the presently disclosed subject matter and are explicitly not intended to limit the scope of the disclosure to the various aspects particular to the presently illustrated non-limiting example. In some embodiments, the use of GPS or other location technology can be included instead of, or as complimentary to, TFL information without departing from the scope of the present disclosure. It is noteworthy that GPS or other location information from a UE is not required to determine TFL information as disclosed in the related application. Thus, even where legacy UEs, e.g., UEs without GPS or eGPS capabilities, are represented in systems 400 and 500, the timing information from those legacy devices can be employed in TFL information determinations. This can be particularly useful in regions that have limited distribution of GPS enabled UEs or where GPS functions poorly due to environmental factors such as urban cores, mountainous regions, etc.

Figure 6:
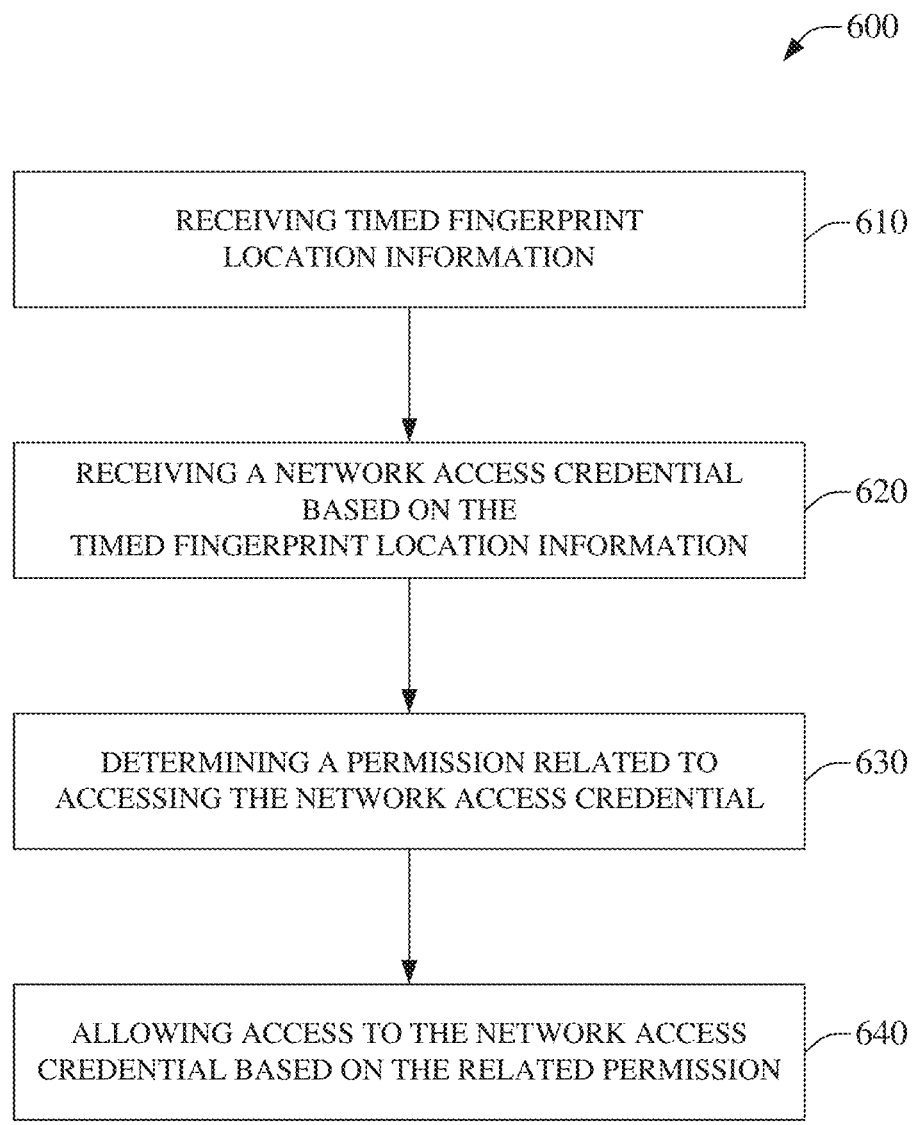
FIG. 6 illustrates a method facilitating sharing a network access credential based on location information in accordance with aspects of the subject disclosure.
Figure 7:
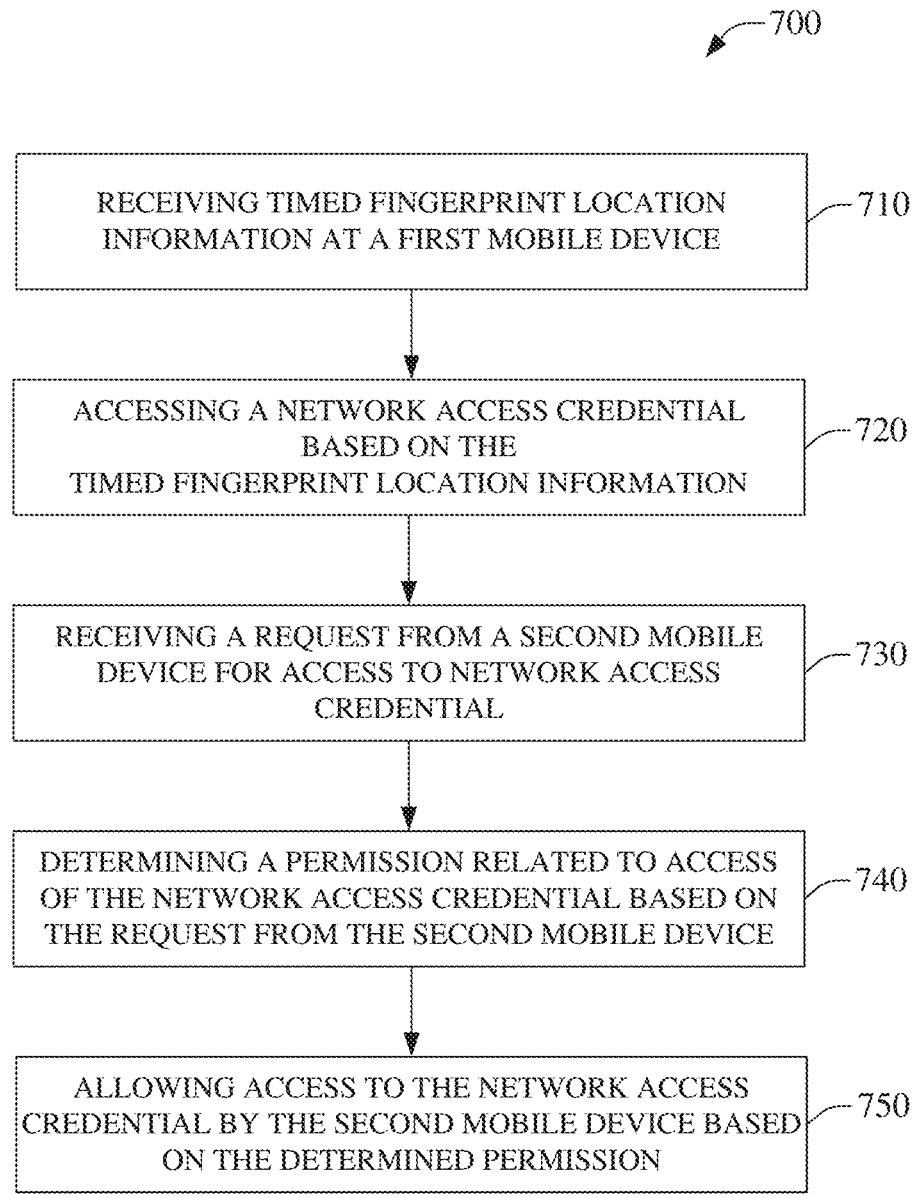
FIG. 7 illustrates a method for sharing a network access credential based on timed fingerprint location information in accordance with aspects of the subject disclosure.
Figure 8:
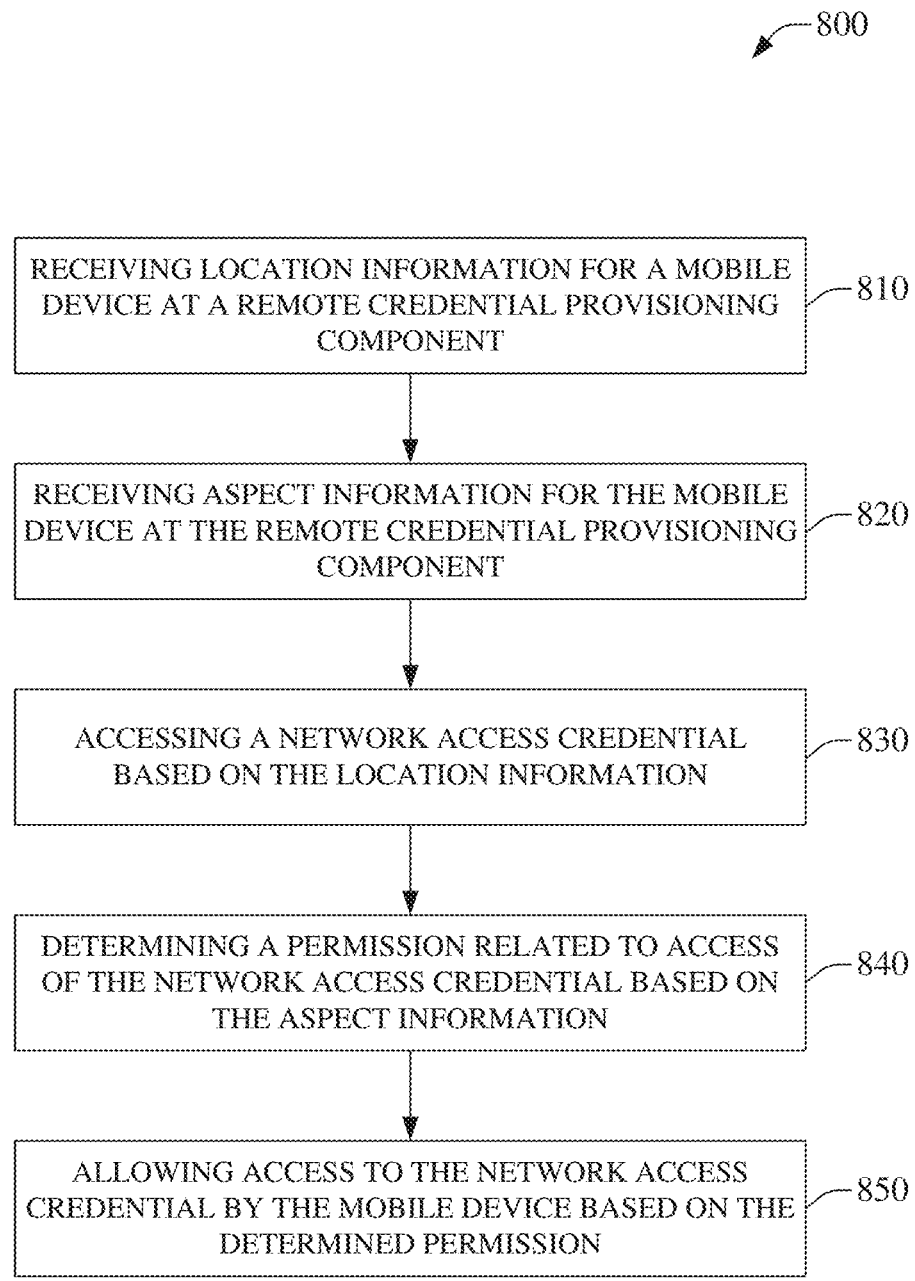
FIG. 8 illustrates a method facilitating sharing a network access credential based on timed fingerprint location information in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating sharing a network access credential based on location information in accordance with aspects of the subject disclosure. At 610, TFL information can be received. TFL information can be location information derived from TFL timing information or TFL timing information that can facilitate determining a location. TFL information can include information to determine a differential value for a NodeB site pair and a bin grid frame, as disclosed in more detail in incorporated U.S. Ser. No. 12/712,424.

TFL information can include location information or timing information as disclosed in more detail in U.S. Ser. No. 12/712,424 filed Feb. 25, 2010, which application is hereby incorporated by reference in its entirety. Further, such information can be received from active state or idle state user equipment as disclosed in more detail in U.S. Ser. No. 12/836,471, filed Jul. 14, 2010, which application is also hereby incorporated by reference in its entirety. As such, TFL information can include location information for a UE, in an active or idle state, based on timing information. As a non-limiting example, a mobile device, including mobile devices not equipped with a GPS-type system, can be located by looking up timing information associated with the mobile device from a TFL information reference. As such, the exemplary mobile device can be located using TFL information without employing GPS-type techniques. In an aspect, TFL information can include information to determine a DV(?,X). The centroid region (possible locations between any site pair) for an observed time value associated with any NodeB site pair (NBSP) can be calculated and is related to the determined value (in units of chip) from any pair of NodeBs. When UE time data is accessed, a DV(?,X) look-up can be initiated. Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frames locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is most likely in both sets, it is probable that the location for the UE is at the intersection of the two sets. Additional NBSPs can be included to further narrow the possible locations of the UE. Employing TFL information for location determination is demonstrably different from conventional location determination techniques or systems such as GPS, eGPS, triangulation or multilateration in wireless carrier environments, near field techniques, or proximity sensors.

At 620, a network access credential can be received. The network access credential can be correlated with location information. As such, TFL information can be employed to select a relevant network access credential. The network access credential can include credentials information data to facilitate access to an associated network. As an example, a network access credential can include a network identifier and password that can be used by a UE to identify and access the network associated with the network identifier. Credentials information data can include a network access key, e.g., WEP key, WPA or WPA2 key, CCMP key, AES key, etc.; SSID information; network name, network location information, e.g., lat/long, address, range information, etc.; or other information associated with accessing a network.

At 630, a permission related to accessing the network access credential can be determined. Access to a network can be related to a permission. A permission can include open access, limited access, or no access. Determining a permission can be associated with a allowing a requesting entity access to a network having a predetermined access policy. A predetermined access policy can be embodied in a set of rules or a logic applied to determining a permission based on the entity requesting access and the network to be accessed. As an example, where a network is open to any user, a permission can simply be determined to allow any user access to the network. As a second example, where a network access policy limits access to subscribers to a service, a permission can limit access to a shared network access credential to subscribers to the service, for instance by verifying a customer number, subscriber identity, credit card number, device identifier, etc.

At 640, access to the network access credential can be allowed based on the related permission. At this point, method 600 can end. A permission that limits access to the network access credential can be applied at 640 to limit access to the network access credential. As an example, where a first UE requests access to a shared network access credential, a permission can be determined denying access where the UE has not paid a monthly fee. As such, at 640, the first UE would not be allowed to access the network access credential by method 600. As a second example, where a first UE requests access to a shared network access credential, a permission can be determined granting access because the UE is owned by Company X and the UE is located at Company X headquarters. As such, at 640, the first UE would be allowed to access the network access credential by method 600.

FIG. 7 illustrates aspects of a method 700 for sharing a network access credential based on timed fingerprint location information in accordance with aspects of the subject disclosure. At 710, TFL information can be received from a first mobile device. TFL information can be location information derived from TFL timing information or TFL timing information that can facilitate determining a location. At 720, a network access credential can be accessed. The network access credential can be correlated with location information, such as TFL information from the first mobile device. This location information, e.g., TFL information, can be employed to select a relevant network access credential. The network access credential can include credentials information data to facilitate access to an associated network.

At 730, a request for access to the network access credential can be received. The request can be from a second mobile device. At 740, in response to receiving the request for access to the network access credential, a permission can be determined. The permission can be related to allowing access to the relevant network access credential. In an aspect, the permission can be based on the request from the second mobile device. Allowing access can be premised on satisfaction of an access policy. Wherein allowing the second mobile device to access the relevant network access credential would satisfy the access policy, a permission can be determined that can facilitate access to the credential.

At 750, access to the network access credential can be allowed for the second mobile device. Allowing access can be based on the determined permission from 740. At this point, method 700 can end. As such, access can be granted where a permission has been received indicating that access should be granted. This permission can be based on the request from the second mobile device satisfying a policy on access to the network access credential. As an example, wherein the request is for access and the access policy for the relevant network is that the network is open to any device, a permission can be determined to allow access to the network access credential. As a second example, where the request is for access from a second device belonging to a user and the access policy for the relevant network is to allow access to the devices of the user, a permission can be determined to allow access to the network access credential. As a third example, where the requesting device is serviced by wireless carrier A and the access policy if to allow access to devices serviced by wireless carrier B only, a permission can be determined to deny access to the network access credential.

FIG. 8 illustrates a method 800 facilitating sharing a network access credential based on timed fingerprint location information in accordance with aspects of the subject disclosure. At 810, location information for a mobile device can be received. The location information can be received at a remote credential provisioning component. A remote credential provisioning component can facilitate access to credential information data. Credential information data can include information relating to accessing a network. At 820, aspect information for the mobile device can be received at the remote credential provisioning component. Aspect information for the mobile device can include identification of a user, a type of mobile device, a feature of the mobile device, a service provider of the mobile device, a specification of the mobile device, or any other information relating to an aspect of the mobile device. This aspect information can be employed in determining a permission when applying an access policy with regard to the mobile device and a relevant network.

At 830, a network access credential can be access based on the location information. Location information can be correlated with networks and access credentials for those networks. As an example, a vehicle network can be correlated with the position of the vehicle of the vehicle network. Where a UE is collocated with the vehicle, access to the vehicle network can be desirable. As such, where an access credential to the vehicle network is available, it can be correlated with the location of the vehicle as well. Thus, where a first user wants to share the vehicle network access credential with other devices in the location of the vehicle, this can be facilitated by selecting relevant network access credentials to share, e.g., selecting the vehicle network credentials because they are collocated with the device seeking to share those same credentials.

At 840, a permission can be determined. The permission can be related to access of the network access credentials. The permission can be based on the aspect information received at 820. Allowing access can be premised on satisfaction of an access policy. Wherein allowing the mobile device to access the relevant network access credential would satisfy the access policy, a permission can be determined that can facilitate access to the credential. Satisfaction of the access policy can be based on the aspect information. As an example, the aspect information can include information of the owner of the mobile device. Where the exemplary mobile device is owned by a corporation and used by a corporation employee, this can satisfy an access policy to allow network access to corporation owned devices. As such, a permission allowing access to the network access credential can be determined that will facilitate access to the credential based on satisfaction of the exemplary access policy based on the aspect information of the mobile device. Wherein aspect information can be related to almost any aspect of the mobile device, a wide variety of access policies can be employed in determining a permission. All such aspect information permutations are within the present scope despite not being explicitly recited for clarity and brevity.

At 850, access to the network access credential can be allowed for the mobile device. Allowing access can be based on the determined permission from 840. At this point, method 800 can end. As an example, where a student registered at a university comes on campus, the student's location can be associated with the student being within an area serviced by the university wireless network. The student's laptop can provide location information, for instance, TFL information. This information can be received by remote credential provisioning component of the university. The student's laptop can also be identified by hardware address information that can also be received at the remote credential provisioning component of the university. A network access credential can be accessed based on the location of the student's laptop, for instance, a network access credential for a North campus access point where the student laptop is located in the North part of the university campus. A permission can be determined to allow access to the North campus credential based on a determination that being a student laptop satisfies an access policy giving students access to university network resources. This permission can allow the laptop to access the network access credential for the North campus access point to facilitate the laptop gaining access to the university network.

Figure 9:
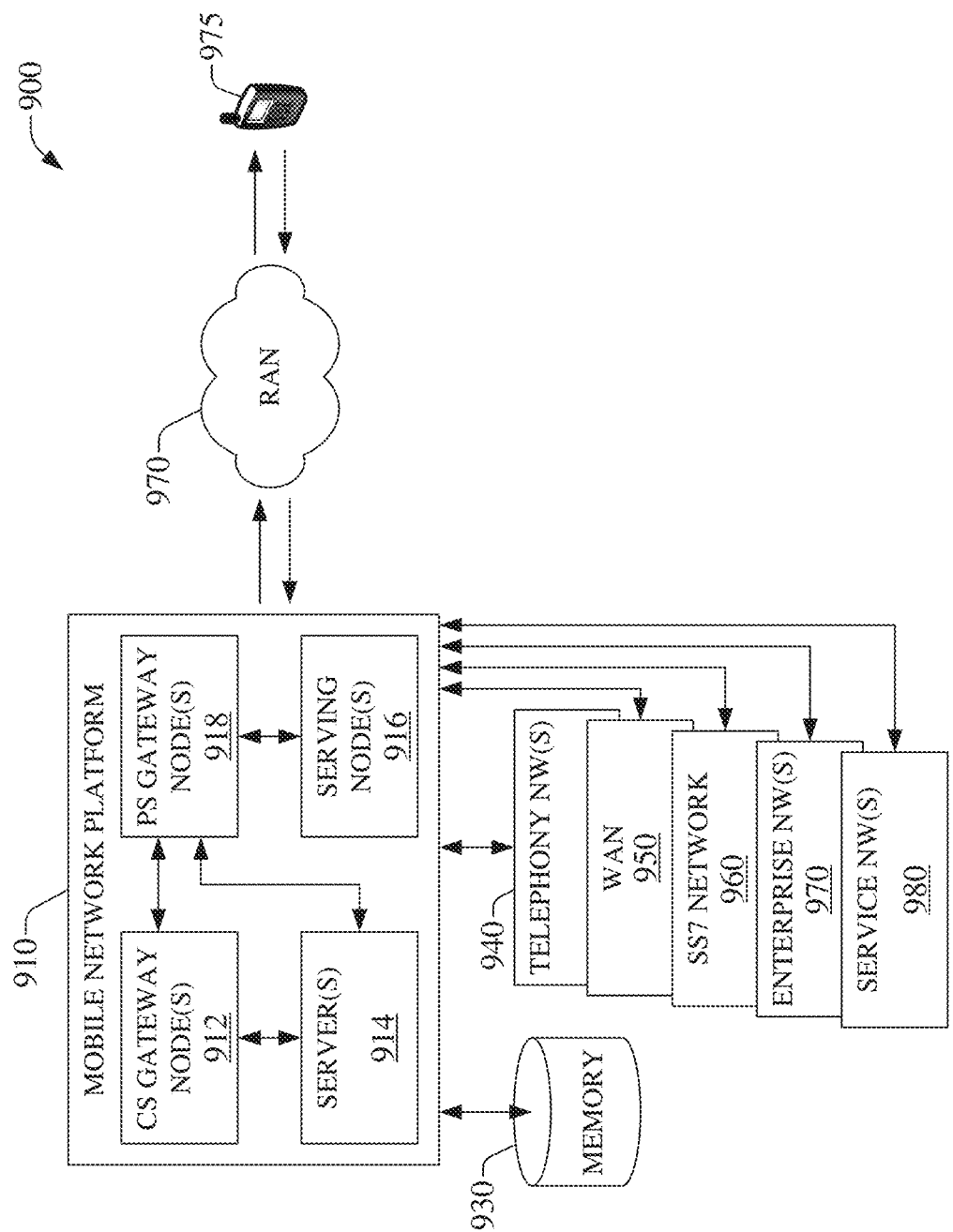
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included as part of a telecommunications carrier network. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Further, network access credentials can be stored in memory 930. Similarly, location information, such as TFL information, can be stored in memory 930. In an aspect, the TFL information can be based on timing signals associated with communication between mobile network platform 910 and mobile device 975 by way of RAN 970. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, can be provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
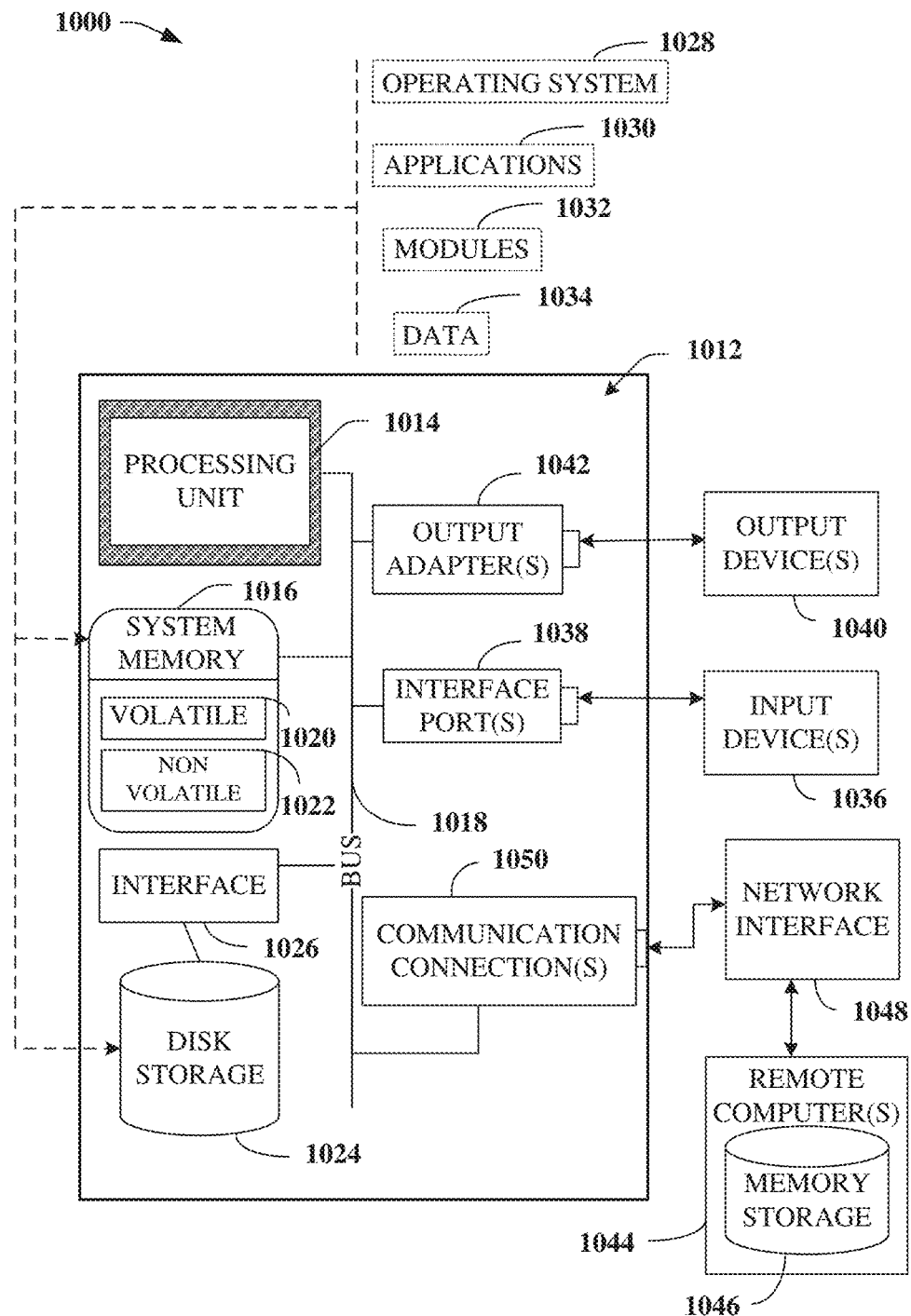
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 1020, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012 includes a processing unit 1014, a system memory 1016, and a system bus 1018. In an embodiment, computer 1012 can be part of the hardware of a timed fingerprint location component. In a further embodiment, computer 1012 can be part of a remote credential provisioning component to facilitate access to credentials. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface can be used, such as interface 1026. In an embodiment, disk storage 1024 can store TFL lookup tables to facilitate lookup of location information based on NodeB site pairs and time values. In another embodiment, disk storage 1024 can store TFL location information. In a further embodiment, network access credentials can be stored on disk storage 1024. Similarly, network history can be stored on disk storage 1024.

Computing devices can include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and can include many or all of the elements described relative to computer 1012.

For purposes of brevity, only a memory storage device 1046 is illustrated with remote computer(s) 1044. Remote computer(s) 1044 can be logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which can be operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any datastream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that provide some or all of aggregation, authentication, call control and switching, charging, service invocation, or gateways. Aggregation can refer to the highest level of aggregation in a service provider network wherein the next level in the hierarchy under the core nodes can be the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Zigbee; other 802.XX wireless technologies, Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   wirelessly sharing, by a first user equipment comprising a processor, via a short-range communications interface, a network access credential for a wireless local area network with a second user equipment, to allow the second user equipment to access a network device of the wireless local area network, wherein the wirelessly sharing comprises:
      receiving, by the first user equipment, via the short-range communications interface, a network access credential request from the second user equipment,
      selecting, by the first user equipment, the network access credential based on a location of the second user equipment;
      determining, by the first user equipment, permission of the second user equipment to access the wireless local area network, based at least in part on a user identity associated with the second user equipment, and
      communicating, by the first user equipment, via the short-range communications interface, the network access credential to the second user equipment.

2. The method of claim 1, wherein the determining the permission comprises determining whether the second user equipment is a member of a group of devices indicated have permission to access the network device of the wireless local area network.

3. The method of claim 1, wherein the determining the permission comprises determining whether the second user equipment is a member of a group of devices indicated to be prohibited to access the network device of the wireless local area network.

4. The method of claim 1, wherein the determining the permission comprises accessing historical network access information related to previous access to the network device of the wireless local area network.

5. The method of claim 1, wherein the determining the permission comprises identifying the second user equipment as a device associated with the user identity.

6. The method of claim 1, wherein the first user equipment comprises a cellular telephone.

7. The method of claim 1, wherein the short-range communications interface communicates according to a Bluetooth wireless protocol.

8. The method of claim 1, wherein the short-range communications interface communicates according to a Wi-Fi protocol.

9. The method of claim 1, wherein the network access credential comprises a Wi-Fi key.

10. The method of claim 1, wherein the network access credential comprises a wired equivalent privacy key, a Wi-Fi protected access key, or a Wi-Fi protected access II key.

11. The method of claim 1, wherein the network access credential comprises a service set identifier and a Wi-Fi protected access II key that are able to be used by the second user equipment to identify and access the network device of the wireless local area network.

12. The method of claim 1, wherein the wirelessly sharing further comprises determining that the second user equipment is within a defined effective range to share the network access credential over a Bluetooth link.

13. A first user equipment, comprising:
   a processor; and
   a memory that stores executable instructions that, when executed by the processor, facilitate performance of operations, comprising:
      determining whether a second user equipment has a permission to access a wireless access point device in a region associated with the first user equipment, based at least in part on a user identity associated with the second user equipment; and
      in response to the determining indicating that the second user equipment has the permission to access the wireless access point device, selecting a network access credential based on a location of the second user equipment and facilitating wirelessly sharing, via a short-range communications interface, the network access credential with the second user equipment.

14. The first user equipment of claim 13, wherein the determining whether the second user equipment has the permission comprises determining whether the second user equipment is in a predetermined list of devices indicated have the permission to access the wireless access point device.

15. The first user equipment of claim 13, wherein the determining whether the second user equipment has the permission comprises determining whether the user identity is associated with the second user equipment as an owner of the second user equipment.

16. The first user equipment of claim 13, wherein the determining whether the second user equipment has the permission to access the wireless access point device comprises accessing historical network access information.

17. The first user equipment of claim 13, wherein the first user equipment comprises a cellular telephone.

18. The first user equipment of claim 13, wherein the short-range communications interface implements a wireless protocol from a group of wireless protocols, the group of wireless protocols comprising a Bluetooth protocol and a Wi-Fi protocol.

19. A non-transitory machine-readable medium, comprising executable instructions that, when executed by a processor of a first user equipment, facilitate performance of operations, comprising:
- receiving, via a short-range communications interface from a second user equipment, request data representative of a network access credential request applicable to network devices of a wireless local area network, to enable the second user equipment to access a network device of the network devices of the wireless local area network;
- selecting a network access credential based on a location of the second user equipment;
- determining that the second user equipment is permitted to access the network device, based at least in part on a user identity determined to be associated with the second user equipment, and communicating, by the first user equipment, via the short-range communications interface, the network access credential to the second user equipment; and
- in response to the determining, sending the network access credential to the second user equipment via the short-range communications interface.

20. The non-transitory machine-readable medium of claim 19, wherein the network access credential comprises a Wi-Fi key to enable the second user equipment to access the network device.

* * * * *